United States Patent
Arnold et al.

(10) Patent No.: US 12,246,524 B2
(45) Date of Patent: Mar. 11, 2025

(54) METHOD FOR PRODUCING A FILM INTERMEDIATE PRODUCT, FILM INTERMEDIATE PRODUCT AND METHOD FOR PRODUCING A PRODUCT

(71) Applicant: OVD Kinegram AG, Zug (CH)

(72) Inventors: Marcus Arnold, Unterägeri (CH); Corrado Fraschina, Bonstetten (CH); Philipp Schuler, Morschach (CH); René Staub, Hagendorn (CH); Harald Walter, Horgen (CH)

(73) Assignee: OVD Kinegram AG, Zug (CH)

( * ) Notice: Subject to any disclaimer, the term of this patent is extended or adjusted under 35 U.S.C. 154(b) by 683 days.

(21) Appl. No.: 17/413,246

(22) PCT Filed: Dec. 9, 2019

(86) PCT No.: PCT/EP2019/084246
§ 371 (c)(1),
(2) Date: Jun. 11, 2021

(87) PCT Pub. No.: WO2020/120403
PCT Pub. Date: Jun. 18, 2020

(65) Prior Publication Data
US 2022/0055363 A1 Feb. 24, 2022

(30) Foreign Application Priority Data
Dec. 14, 2018 (DE) .......................... 102018132321.2

(51) Int. Cl.
*B32B 37/00* (2006.01)
*B32B 3/14* (2006.01)
(Continued)

(52) U.S. Cl.
CPC .............. *B32B 37/025* (2013.01); *B32B 3/14* (2013.01); *B32B 7/14* (2013.01); *B32B 37/1292* (2013.01);
(Continued)

(58) Field of Classification Search
CPC ... B32B 2425/00; B32B 2451/00; B32B 3/14; B32B 37/025; B32B 37/1292;
(Continued)

(56) References Cited

U.S. PATENT DOCUMENTS

2007/0211238 A1 9/2007 Hoffmuller et al.
2009/0250158 A1* 10/2009 Streb ...................... B42D 25/00
156/219
(Continued)

FOREIGN PATENT DOCUMENTS

CA 2 745 913 A1 7/2010
CN 107921742 A 4/2018
(Continued)

OTHER PUBLICATIONS

Wikipedia: "Collage", Aug. 21, 2017 (Aug. 21, 2017), retrieved from the Internet: URL:https://web.archive.org/Web/20170916175525/https://de.wikipedia.org/wiki/Collage.*
Office Action for DE102018132321.2.*
Office Action for EP19817685.1.*
Office Action for JP2021-533426.*
Chinese Office Action dated Jul. 5, 2022.
Japanese Office Action dated Oct. 3, 2023.
(Continued)

*Primary Examiner* — Sonya M Sengupta
(74) *Attorney, Agent, or Firm* — Hoffmann & Baron, LLP

(57) ABSTRACT

A method for producing a film intermediate product (1), a film intermediate product (1), as well as a product produced hereby. The film intermediate product (1) is here formed by means of depositing one or more film elements (311 to 314), which is or are formed in each case of a cutout of one or more donor films (301 to 304).

27 Claims, 10 Drawing Sheets

(51) Int. Cl.
*B32B 7/14* (2006.01)
*B32B 37/12* (2006.01)
*B42D 25/324* (2014.01)
*B42D 25/328* (2014.01)
*B42D 25/364* (2014.01)
*B42D 25/369* (2014.01)
*B42D 25/373* (2014.01)
*B42D 25/378* (2014.01)
*B42D 25/455* (2014.01)
*B42D 25/46* (2014.01)
*B42D 25/47* (2014.01)

(52) U.S. Cl.
CPC .......... *B42D 25/455* (2014.10); *B42D 25/46* (2014.10); *B42D 25/47* (2014.10); *B32B 2425/00* (2013.01); *B32B 2451/00* (2013.01); *B42D 25/324* (2014.10); *B42D 25/328* (2014.10); *B42D 25/364* (2014.10); *B42D 25/369* (2014.10); *B42D 25/373* (2014.10); *B42D 25/378* (2014.10)

(58) Field of Classification Search
CPC ...... B32B 7/14; B42D 25/324; B42D 25/328; B42D 25/36; B42D 25/364; B42D 25/369; B42D 25/373; B42D 25/378; B42D 25/45; B42D 25/455; B42D 25/46; B42D 25/47
See application file for complete search history.

(56) References Cited

U.S. PATENT DOCUMENTS

| | | |
|---|---|---|
| 2013/0063826 A1 | 3/2013 | Hoffmuller et al. |
| 2013/0118681 A1 | 5/2013 | Lin et al. |
| 2017/0267013 A1 | 9/2017 | Staub et al. |
| 2017/0320347 A1 | 11/2017 | Staub et al. |
| 2018/0215190 A1 | 8/2018 | Reuther |
| 2019/0001735 A1 | 1/2019 | Cathomen et al. |

FOREIGN PATENT DOCUMENTS

| | | |
|---|---|---|
| DE | 102010020039 | 11/2011 |
| DE | 102010020039 A1 | 11/2011 |
| EP | 3183124 | 6/2017 |
| EP | 3183124 A1 | 6/2017 |
| JP | 2012-512059 A | 5/2012 |
| WO | 2005/108108 A2 | 11/2005 |
| WO | 2007/048563 A2 | 5/2007 |
| WO | WO 2007/048563 | 5/2007 |
| WO | 2016/092044 A1 | 6/2016 |
| WO | 2017/102744 A1 | 6/2017 |
| WO | WO 2017/102744 | 6/2017 |

OTHER PUBLICATIONS

European Office Action dated Jul. 25, 2022.
Wikipedia, "Collage", Aug. 21, 2017.
Sheena Solitaire: "Make a collage with recycled plastic bags", Jul. 1, 2015.

* cited by examiner

METHOD FOR PRODUCING A FILM INTERMEDIATE PRODUCT, FILM INTERMEDIATE PRODUCT AND METHOD FOR PRODUCING A PRODUCT

This application claims priority based on an International Application filed under the Patent Cooperation Treaty, PCT/EP2019/084246, filed Dec. 9, 2019, which claims priority to DE 102018132321.3, filed Dec. 14, 2018.

BACKGROUND OF THE INVENTION

The invention relates to a method for producing a film intermediate product, a film intermediate product produced in particular by means of this method, and a product produced by means of this method and/or the film intermediate product.

For the decoration and/or for the security, in particular for the security against forgery, of products, such as for example labels and injection-molded parts or banknotes and ID documents, stamping films, in particular hot-stamping films or preferably also laminating films, are used.

Thus, for example, a method for producing a covering part from plastic is described in DE 10 2010 020 039 A1. For this purpose, a hot-stamping film wound on a roll is guided from the top down through an injection mold. The film is clamped between the mold halves when the mold is closed. When the molten material is injected, the film is pressed against the wall of the cavity by the pressure of the molten material and a varnish layer of the hot-stamping film joins to the plastic due to the high temperature of the molten material. After cooling, the polyester carrier film is detached from the varnish layer and the fully decorated component can then be removed.

SUMMARY OF THE INVENTION

The object of the invention is to specify an improved method and an intermediate product used for it, by means of which a product can be equipped with decorative and/or functional and/or forgery-proof elements.

This object is achieved by a method for producing a film intermediate product comprising the following steps, which are in particular carried out once and/or multiple times in any order, preferably in the following order:
a) providing a receiver film
b) providing one or more donor films,
c) depositing one or more film elements, which is or are formed in each case of a cutout of one of the one or more donor films, on the receiver film.

Both the receiver film and the one or more donor films are preferably so-called transfer films here. In particular in this case, none of the carrier substrates of these films, such as for example PET carrier films, remains in or on the end product.

The object is further achieved by a film intermediate product comprising a receiver film and one or more film elements, which is or are formed in each case of a cutout of one of the one or more donor films and which is or are deposited on the receiver film.

The object is further achieved by a method for producing a product in which such a film intermediate product is used or in which a film intermediate product produced in such a way is used.

The invention achieves numerous advantages:

Thus it is possible to combine decorative and/or functional and/or forgery-proof elements, which are different from one another and require for example different manufacturing processes, in the intermediate product and to integrate them into the product or deposit them on the product by means of a single subsequent application process. The receiver film thus acts as a "transporting medium" for further decorative and/or functional and/or forgery-proof elements provided by the one or more donor films.

Further, the receiver film here can provide further functional elements, which make it possible to integrate the film elements into the product in the first place, for example special protective layers and/or carrier layers and/or special adhesive layers, which are necessary for the application process for integration into the product. Thus, for example for integration by means of a hot-stamping process or by means of back-injection molding, a correspondingly formed adhesive layer, a carrier layer, protective layers and/or special detachment properties are necessary in order to make such an application process possible in the first place. It is not necessary to provide all of these functions through corresponding layers of the donor film, which results in corresponding cost savings.

Further functional elements are preferably formed by additionally deposited prints and/or other coatings before and/or after one or more film elements are deposited.

Furthermore, it is thus possible to optimize the donor films, with respect to their structure and their production process, for the decorative and/or functional and/or forgery-proof elements provided by them, which thus would not be the case if they had to provide the functions necessary for the process of application to the product. Further advantages result when different decorative and/or functional and/or forgery-proof elements are provided by the donor films and/or by the receiver film. The respective films can hereby be optimized for the provision of their respective decorative and/or functional and/or forgery-proof elements, and it is further also possible to achieve a combination of decorative and/or functional and/or forgery-proof elements which cannot be combined in a common manufacturing method at all, or only in a complex manner or otherwise unfavorably. In particular, it can also be the case that a first decorative and/or functional and/or forgery-proof element can be generated on a film, but this element hinders or even prevents the subsequent production of a further decorative and/or functional and/or forgery-proof element on the same film in further manufacturing steps. This can for example be due to material properties of the first decorative and/or functional and/or forgery-proof element, such as for example a partial opaque metal layer which partially prevents or shields the curing of the further decorative and/or functional and/or forgery-proof element, in particular in the case of a subsequent UV replication.

Further advantages result from the fact that the decorative elements and/or functional and/or forgery-proof elements can be applied to the product on, next to and over one another with a high level of register accuracy. This is because, during the manufacture of the intermediate product, correspondingly optimized process conditions can be created for the "combination" of the decorative and/or functional and/or forgery-proof elements which are not subjected to the process conditions for the application to the product, and thus are for example exposed to smaller pressure loads, thermal loads, dust loads and/or register deviations. Further, this also results in the advantage that the reject rate is reduced considerably.

By register or registration, or register accuracy or registration accuracy, is preferably meant a positional accuracy of two or more elements and/or layers, here in particular a donor film and/or a film element, relative to the receiver film.

The register accuracy is to range within a predetermined tolerance, which is to be as small as possible. At the same time, the register accuracy of several elements, partial regions, in particular one or more film elements, films, plies and/or layers, relative to one another is an important feature in order to increase the process reliability.

The positionally accurate positioning is effected in particular by means of markings, in particular by means of sensorially, preferably optically detectable registration marks or register marks. These markings, in particular registration marks or register marks, preferably either represent specific separate elements or regions or layers or are preferably themselves part of the elements or regions or layers to be positioned.

Further, advantages result from the fact that cost-intensive materials and/or processes can be used particularly "economically" and in a carefully targeted manner and can be processed by means of process conditions adapted to them. This also results in cost savings as well as a reduction in the reject rate.

By an intermediate product, in particular by a film intermediate product, is preferably meant here a product which is intended still to be processed further to form an end product, in particular still to be applied to a substate and/or be integrated in a substrate to form an end product.

Further advantageous embodiments of the invention are described in the dependent claims.

The receiver film preferably has a receiver carrier ply and/or the donor film has a donor carrier ply. The donor carrier ply and/or the receiver carrier ply preferably consists of a single- or multi-ply carrier substrate, in particular made of PET, BOPP, PEN, PMMA, PC, ABS, PU, PVC and/or glass. The carrier substrate is preferably at least partially transparent, in particular in a range visible to the human eye and/or in the UV range. The thickness of the carrier substrate preferably lies in the range 4 µm to 150 µm, preferably in the range 10 µm to 75 µm.

Further, it is possible for the receiver carrier ply and/or the donor carrier ply to be formed from a hybrid material which comprises plastic layers and layers of fibrous material, such as for example paper layers.

The receiver film, the one or more film elements and/or the one or more donor films preferably have at least one decorative ply and/or at least one functional ply and/or a delamination ply.

The receiver carrier ply can have at least one decorative ply and/or at least one functional ply and/or a delamination ply on one side or also on its two opposite sides.

In particular, it is possible for the receiver carrier ply to have a decorative ply on the two opposite sides in each case.

In particular, it is possible for the receiver carrier ply to have a functional ply on the two opposite sides in each case.

It is also possible for the receiver carrier ply to have a decorative ply on one side and to have a functional ply on the opposite side.

A functional ply is in particular a ply which forms an electrical function and/or a microfluidic function and/or an optical function. The functional ply preferably forms one or more elements, selected from: a sensor, a touch sensor, a display, an LED or OLED, an antenna, an RFID element, a solar cell, an electric circuit.

A decorative ply is in particular single- or multi-layered and in each case contains, preferably in each case over part of the surface and/or over the whole surface, one of the following layers or a combination of the following layers:

One or more varnish layers. These varnish layers preferably contain dyes and/or pigments, in particular colored pigments, optically variable pigments, thermochromic pigments, luminescent dyes and/or pigments, magnetic pigments and/or electrically conductive pigments. The varnish layers here are preferably formed opaque, semi-transparent and/or transparent.

The one or more varnish layers are preferably deposited by means of printing, in particular by means of gravure printing, relief printing, screen printing, flexographic printing and/or by means of digital printing methods. It is also possible for the depositing to be effected by means of further coating techniques, such as for example slot casting and/or spraying. The one or more varnish layers are in particular deposited partially and/or over the whole surface.

One or more layers containing a liquid-crystal material. These liquid-crystal materials are preferably aligned on a respective orientation layer. It is also possible here for the liquid-crystal material of the respective layer to have regions in which the liquid-crystal material is oriented differently and thus has different optical properties, for example a different polarization and/or a different optically variable color-change effect. In particular a cholesteric or nematic liquid-crystal material is used as liquid-crystal material.

One or more layers containing a thin-film system for generating color-shift effects dependent on the angle of view. Such a thin-film system is characterized in particular in that this thin-film system has one or more spacer layers which meet the $\lambda/4$ or $\lambda/2$ condition in particular for a wavelength $\lambda$ in the visible wavelength range. The incident light is reflected/refracted at the boundary surfaces of this spacer layer, whereby a corresponding color-change effect is generated by interference. Such a thin-film system preferably has an absorber layer, in particular a semi-transparent absorber layer, preferably made of a metallic material, a dielectric spacer layer and preferably a reflective layer, in particular an opaque or semi-transparent metal layer. A thin-film layer system can furthermore preferably also be formed of a sequence of high- and low-refractive-index dielectric layers, of which one or more, preferably two or more, meet the above-mentioned $\lambda/4$ or $\lambda/2$ condition. High-refractive-index layers are in particular layers with a refractive index of more than 1.5. Low-refractive-index layers are in particular layers with a refractive index of less than 1.5.

One or more metallic layers. The one or more metallic layers preferably have two or more layers made of different metals. For this purpose, metals or metal alloys which have a different optical appearance for the human observer, for example made of Al, Cu, Au, Ag, Cr and/or Sn, are preferably used. The metal layers can here be formed opaque, semi-transparent and/or transparent.

By opaque is meant here a transmissivity of less than 15% in the visible wavelength range, by semi-transparent is meant a transmissivity between 15% and 60% in the visible wavelength range and by transparent is meant a transmissivity of more than 60% in the visible wavelength range in at least one partial region.

One or more volume hologram layers. A volume hologram layer here preferably consists of a photosensitive material which is exposed to light in a holographic exposure process with an interference pattern, in which at least one object beam and at least one reference beam are superimposed.

A master which has a microstructured, in particular a diffractive and/or refractive, surface relief is preferably used as hologram master here. The volume hologram written into the volume hologram layer can here be a reflection hologram or a transmission hologram. Further, it is possible for the volume hologram layer still to be aftertreated after exposure of the volume hologram. For example, it is possible for the distance between the Bragg planes of the volume hologram to be altered in partial regions or over the whole surface by such an aftertreatment, for example the depositing of corresponding substances or by radiation, and thus for the color of the volume hologram to be altered correspondingly over the whole surface or over part of the surface.

One or more layers having an optically active surface structure or an optically active surface relief. These layers preferably consist of a replication layer, in particular a layer of a thermoplastic and/or UV-curable varnish. The respective surface structure is preferably introduced into this layer by means of a stamping tool, in particular by means of thermal replication and/or UV replication.

The surface structure or the surface relief is preferably a diffractive surface structure. Such a surface structure can have the following elements individually or in combination: computer-generated hologram, first- or higher-order diffraction structure, in particular consisting of sinusoidal or blazed-type diffractive gratings or Fresnel-type microstructures, and/or zero-order diffraction structure.

The surface structure can be a holographic surface structure, which is formed in particular of a surface relief produced in a holographic process.

The surface structure is preferably a matte structure, in particular an anisotropic or isotropic matte structure. Such matte structures can here have regions in which the structure parameters of the matte structure differ from one another and which thus scatter the light differently, for example scatter in different preferred directions or scatter at a different scattering angle.

The surface structure is preferably a macrostructure. Such macrostructures preferably have substantially refractively acting structure elements. These macrostructures preferably have a microlens structure, a microprism structure and/or a micromirror structure, the respective structure elements of which are formed of lenses, substantially refractively acting prisms and/or micromirrors.

One or more reflective layers. These reflective layers are formed in particular of metallic layers which are transparent, semi-transparent and/or opaque. However, it is also possible for the reflective layers to be formed of dielectric reflective layers. For this purpose, layers made of a transparent low- or high-refractive-index material, such as for example ZnS or $TiO_2$, are preferably used.

The layers of the decorative ply here can in particular be provided not only over the whole surface, but also over part of the surface. It is thereby possible for the above-listed layers to be arranged in the form of a pattern. By in the form of a pattern is meant for example a graphically designed outline, a figurative representation, an image, a motif, a symbol, a logo, a portrait, an alphanumeric character, a text, a grating and/or the like or a combination of one or more of the above patterns.

A decorative ply preferably forms a security feature. A security feature is in particular a feature which increases the protection against forgery of an object.

In particular, it is also possible for a functional ply and/or a delamination ply to form a security feature.

A delamination ply preferably has a partial detachment layer and/or bonding layer, which brings about a delamination of the film intermediate product and/or a tearing of layers of the film intermediate product in particular in the case of an attempt to detach it.

In particular, by a delamination ply is meant a partial release ply. This is a plastic ply with several layers, the bond of which has locally different strengths. A partial destruction of the feature is thereby preferably achieved in the case of attempts to detach it.

The receiver film is preferably a receiver transfer film, in particular a hot-stamping film, cold-stamping film or thermal-transfer film.

At least one of the one or more donor films is preferably a donor transfer film, which is in particular selected from: hot-stamping film, cold-stamping film and thermal-transfer film.

At least one of the film elements is preferably a cutout of a donor transfer film, in particular a hot-stamping film, cold-stamping film and/or thermal-transfer film.

A stamping film preferably comprises a carrier substrate, for example made of PET, with transfer plies detachably deposited thereon. The transfer plies can in particular be transferred, preferably in particular shapes, to a further substrate by means of suitable methods, for example hot stamping, cold stamping and/or thermal transfer.

It has proved to be advantageous if step c) is carried out by means of hot stamping, cold stamping and/or thermal transfer.

In particular, the receiver film is a hot-stamping film and at least one of the one or more donor films is a hot-stamping film. Preferably, the receiver film is provided as a hot-stamping film and at least one of the one or more donor films is also provided as a hot-stamping film. In particular, at least one of the film elements is a cutout of a hot-stamping film and the receiver film is a hot-stamping film.

It is advantageous here that film elements which have to be produced at high pressure and/or high temperature can be arranged on a receiver film which has features which are damaged in the case of such high pressure/high temperatures.

Further, it is possible for the receiver film to be a receiver laminating film, for at least one of the one or more donor films to be a donor laminating film and/or for at least one of the one or more film elements to be a cutout of a donor laminating film. The one or more film elements here are preferably deposited on the receiver film by means of lamination.

A laminating film is in particular a film, preferably a plastic film, consisting of several layers the bond of which is not separable.

The receiver transfer film preferably has a receiver carrier ply and a receiver transfer ply, wherein in particular the receiver transfer ply is detachable from the receiver carrier ply and/or has a receiver detachment layer, which is arranged between the receiver transfer ply and the receiver carrier ply.

The donor transfer film preferably has a donor carrier ply and a donor transfer ply, wherein in particular the donor transfer ply is detachable from the donor carrier ply and/or has a donor detachment layer, which is arranged between the donor transfer ply and the donor carrier ply.

It has proved to be advantageous for the receiver detachment layer and/or the donor detachment layer to be formed multi-layered and to have at least one wax layer.

A detachment layer is preferably designed such that a nondestructive separation of several layers joined together via the detachment layer is brought about when the detachment layer is activated, preferably by thermal and/or mechanical activation. By detachable is preferably meant that a join can be separated, wherein no layer and/or only the detachment layer is destroyed.

It is preferably also possible for a detachment layer to be arranged, in particular to be deposited partially between several layers, such that a desired destruction and/or shaping of at least one of the adjacent layers takes place in the case of detachment.

Thus, for example, it is preferably possible for a shaping of at least one film element transferred by means of the donor transfer ply to take place when a donor transfer ply is detached from a donor carrier ply.

Further, it is possible in particular for a shaping of regions of the receiver transfer ply to take place when the receiver transfer ply is detached from the receiver carrier ply.

Further, it is possible for the receiver detachment layer and/or the donor detachment layer to have a layer which is designed as a print-receiving layer for a subsequent printing step.

Further, it is possible for the receiver detachment layer and/or the donor detachment layer to have at least one adhesive layer, in particular with a thickness of from 0.2 µm to 20 µm, preferably with a thickness of from 0.2 µm to 10 µm.

It is hereby possible in particular for the film intermediate product, after detachment of a donor transfer ply and/or the receiver transfer ply, to have an uncovered adhesive layer which is preferably used to produce a product, preferably by applying the film intermediate product to a target substrate.

Further, the following steps are preferably carried out in step c):
c1) bringing one or more donor transfer films into contact with the receiver film,
c2) detaching, in particular mechanically separating, the donor carrier ply from one or more first partial regions of the respective donor transfer ply at least in regions in such a way that the one or more first partial regions remain as film elements on the receiver film,
c3) optionally peeling the respective donor carrier ply with one or more second partial regions of the respective donor transfer ply off the one or more film elements.

Further, it is advantageous for one or more of the first partial regions in step c) to be defined individually, in particular by means of a digital printing method, preferably by means of inkjet printing, by means of a thermal-transfer printhead and/or by means of irradiation, in particular by means of actuation of an exposure matrix.

It is further possible for one or more thermal elements, in particular of a thermal-transfer printhead, to be actuated in step c).

Preferably, in step c), an adhesive layer is printed, in particular by means of a digital printing method, onto one or more of the donor films and/or onto the receiver film in one or more of the first partial regions, but is not printed on in the one or more second partial regions.

Further, it is possible, in step c), for an adhesive layer, in particular an adhesive layer of the receiver film, preferably a receiver adhesive layer, and/or an adhesive layer of one or more of the donor films, preferably a donor adhesive layer, to be activated, in particular thermally activated and/or activated by irradiation, in the one or more first partial regions, but not to be activated in the one or more second partial regions. In particular, in step c), the adhesive layer is activated by thermal softening of the adhesive layer and/or by thermally induced and/or irradiation-induced crosslinking of the adhesive layer.

By an adhesive layer which is activated is preferably meant an adhesive layer the adhesive property of which has been triggered, preferably which is sticky. In particular, an activated adhesive layer can produce a bond, preferably between two surfaces. After the bond has been produced, the adhesive layer is preferably no longer sticky. In particular, a UV-crosslinked adhesive is no longer sticky after curing and a heat-seal adhesive is no longer sticky after cooling. It is also possible for a PSA adhesive layer (PSA=pressure sensitive adhesive) to remain sticky after the bond has been produced, as can be observed for example in particular in the case of a tesa adhesive tape or Post-it Notes.

The adhesive layer has in particular a layer thickness of from 0.2 µm to 20 µm, preferably a layer thickness of from 0.2 µm to 10 µm.

It has proved to be advantageous for one or more severances, voids and/or recesses to be introduced at least into one of the one or more donor films, in particular into the donor transfer ply, wherein the one or more severances, voids and/or recesses are preferably introduced between the first and second partial regions of the respective donor transfer ply.

By voids is meant in particular regions in which no layer is provided.

By recesses is meant in particular partially removed regions and/or separations in a layer which preferably do not completely cut through the layer.

By severances is meant in particular removed regions and/or separations in a layer which preferably completely cut through the layer.

Further, it is possible for the receiver film and/or at least one of the one or more donor films to be provided with one or more severances, voids and/or recesses.

The one or more severances, voids and/or recesses are preferably provided in the form of a pattern.

The shape of the one or more severances, voids and/or recesses is in particular selected from: strip-shaped, round, circular, oval, polygonal, rectangular, square, in the form of alphanumeric characters, logos, microtexts, images, portraits, pictograms, wherein the shape of the one or more voids, recesses and/or severances is preferably identical or different.

The one or more severances, voids and/or recesses, in particular when viewed perpendicular to a layer having the corresponding severances, voids and/or recesses, preferably form one or more lines. The one or more lines are preferably closed, endless and/or unlimited, in particular in a direction following their length. Further, it is possible for the one or more lines to be open, limited and/or broken, in particular in a direction following their length.

Further, it is possible for the one or more severances, voids and/or recesses, in particular the one or more lines, to be arranged completely and/or partially on the perimeter of an image.

It is also possible for the one or more severances, voids and/or recesses to have been or to be introduced for example in a regular arrangement, quantity, shape and/or size, in particular as a perforation.

The one or more severances, voids and/or recesses are formed in particular by means of cutting, punching, in particular vertical punching, semi-rotary punching and/or rotary punching, needles and/or lasers.

Further, it is advantageous for the donor carrier ply to be peeled off the donor transfer ply in step c) at a peeling angle, in particular to be peeled off at a peeling angle between 30° and 180°, preferably to be peeled off between 90° and 180°.

In particular, a sharp-edged depositing of the film elements is favored by means of severances, recesses, voids and/or a peeling angle in the above-mentioned angle range. More cost-effective tools, such as for example stamping dies that are not customized, for depositing the film elements on the receiver film are thus possible.

In particular, it is also possible to deposit an adhesive layer over the whole surface over the first and the second partial region of a donor film and to deposit the corresponding film elements on the receiver film by means of a customized stamping die.

It is expedient if the peeling angle is set via at least one roll. Further, it is expedient if the donor carrier ply is peeled off over an edge. Very pointed edges, in particular with a small angle between the edges, which allow a narrowly localized peel location with a large peeling angle, preferably up to 180°, are particularly expedient.

Further, the use of mechanical separation aids in particular makes it easier to detach donor transfer plies from the respective donor carrier ply. Mechanical separation aids can be for example blowing air bars or separation blades. Further, the advantage results in particular that forces for detaching the donor transfer plies from the respective donor carrier plies are reduced, with the result that preferably thermal and/or mechanical loads during the production of the film intermediate product can be reduced and in particular the receiver and or donor transfer plies are prevented from being inadvertently damaged.

Further, it is possible for the detachment force between donor carrier ply and donor transfer ply, preferably at least when step c) is carried out, to be smaller than the detachment force between receiver carrier ply and receiver transfer ply, in particular for the detachment force to be at least 10%, preferably at least 20%, smaller.

A detachment force can preferably be determined on the basis of FINAT method FTM 2. For this purpose, a film is bound on a flat substrate by means of a double-sided adhesive tape, wherein the side with the detachment layer points towards the adhesive tape. Sellotape 4485 Duplo with a width of 25 mm is used, for example. Pressure is preferably applied with a FINAT hand roller with a coat weight of 2500 g+/−100 g. The test length is at least 20 cm. The detachment force is determined at a peeling angle of 90° and a speed of 300 mm/min with a tensile testing machine, for example from Zwick.

In particular, the average detachment force can be determined with reference to the measurement curve, and it typically lies in the range from 0.3 cN to 75 cN per cm of strip width. In the process, it is preferably to be borne in mind that the measured value is composed of the detachment of the transfer plies from the carrier and the tearing of the transfer plies at the edges (of the strip). In the case of an optional introduction of recesses, severances and/or voids into the transfer plies, for example by punching the transfer plies, the tearing does not apply.

By edges is preferably meant the visible edges when viewed perpendicular to a plane spanned by a film.

If the peeling angle is increased, the measured detachment force typically decreases considerably. At a peeling angle of 180°, for example, the measured force falls to less than 50% compared with the force measured at a peeling angle of 90°.

Through a suitable process control, in particular in the case of a cold stamping and/or hot stamping, in step c), it has surprisingly been shown that even donor transfer plies with relatively large detachment forces can be deposited on a receiver film, which is preferably a receiver transfer film, the receiver transfer plies of which have small detachment forces, without the receiver transfer ply being or having been detached from the receiver carrier ply and/or a desired function in the film intermediate product being lost, for example the function of a delamination ply.

In the case of a smaller average detachment force of the receiver detachment layer compared with the donor detachment layer, the detachment force of the donor detachment layer can advantageously be reduced, through the adaptation of the peeling angle of the donor carrier ply and/or the introduction of voids, severances and/or recesses into a donor film, such that still only the donor carrier ply is detached.

The detachment behavior is advantageously positively affected by mechanical separation aids, such as for example blowing bars or separation blades. By way of example, during the transfer of the donor transfer plies, not only must attention be paid to possible damage to the donor and/or receiver transfer plies, but the transfer is also to take place in a desired shaping. In particular defects and unintentionally protruding and unbound parts of the donor transfer plies are to be avoided. Here, both separation aids and the above-described voids, severances and recesses are advantageously also used in the donor film.

Thus, it is possible in particular that, when the one or more film elements are deposited, by means of mechanical separation aids, such as for example blowing bars and/or separation aids, and by means of one or more voids, severances and/or recesses in at least one of the one or more donor films, a desired shaping of the film elements is guaranteed and damage to the film elements and the receiver film, in particular the receiver transfer ply, is avoided.

In particular, the force for detaching the donor carrier ply from the donor transfer ply is lies in the range of from 0.3 cN per cm of strip width to 50 cN per cm of strip width, preferably from 0.3 cN per cm of strip width to 15 cN per cm of strip width, in particular measured according to FINAT method FTM 2. Further, the force for detaching the receiver carrier ply from the receiver transfer ply is lies in the range of from 0.3 cN per cm of strip width to 75 cN per cm of strip width, preferably from 1.5 cN per cm of strip width to 50 cN per cm of strip width, in particular measured according to FINAT method FTM 2.

The receiver film preferably has a receiver adhesive layer. In particular, the receiver adhesive layer is arranged on the side facing the one or more donor films in step c). Further, it is possible for the one or more donor films in each case to have a donor adhesive layer on the side facing the receiver film in step c).

The receiver and/or donor adhesive layer has in particular a layer thickness of from 0.1 µm to 20 µm, preferably a layer thickness of from 0.2 µm to 12 µm, and in particular preferably a layer thickness of from 0.2 µm to 2 µm.

The receiver film preferably has a receiver adhesion-promoter layer. In particular, the receiver adhesion-promoter layer is arranged on the side facing the one or more donor films in step c).

Further, it is possible for the one or more donor films in each case to have a donor adhesion-promoter layer on the side facing the receiver film in step c).

The receiver and/or donor adhesion-promoter layer has in particular a layer thickness of from 0.01 µm to 5 µm, preferably a layer thickness of from 0.02 µm to 2 µm.

Such an adhesion-promoter layer preferably improves the binding of an adhesive layer which has been deposited for example on the donor film, or respectively the receiver film. When the adhesive layer is melted on during the hot stamping or when it is crosslinked during the cold stamping, the adhesion-promoter layer preferably ensures a good binding, but need not act as an adhesive itself.

The total thickness of the layers which are preferably present between the two reflective or color layers of the receiver and donor films is preferably less than 10 µm and in particular less than 5 µm, particularly preferably less than 3 µm.

Thus, it is possible in particular for the distance between a reflective layer or a varnish layer of the one or more film elements and a reflective layer or a varnish layer of the receiver film and/or the distance between reflective layers and/or varnish layers of several film elements after the depositing in step c) to be less than 10 µm, in particular to be less than 5 µm, particularly preferably to be less than 3 µm.

It has proved to be advantageous for a further adhesive layer to be deposited on, preferably applied to, a target substrate, the receiver film and/or the one or more donor films and/or the respective donor transfer ply, in particular wherein the further adhesive layer is used after step c) to join the film intermediate product to a target substrate, wherein the further adhesive layer is single- or multi-layered.

The further adhesive layer has in particular a layer thickness of from 0.1 µm to 20 µm, preferably a layer thickness of from 0.2 µm to 12 µm.

The further adhesive layer, receiver adhesive layer and/or donor adhesive layer are preferably in each case a heat-seal adhesive layer, which is or are activated by means of pressure and heat. The further adhesive layer, receiver adhesive layer and donor adhesive layer are preferably in each case a heat-seal adhesive layer.

Further, it is possible for the further adhesive layer to be deposited, preferably applied, as an adhesive layer of an assistance layer and/or of a donor detachment layer of the one or more donor films. This results in the particular advantage that, after the film elements have been deposited, no further step for applying an adhesive layer needs to be carried out and/or that differences in thickness can already be compensated for by an adhesive layer.

Furthermore, it is possible for a further adhesive layer, in particular a PSA adhesive layer, to be deposited on, preferably applied to, a carrier, in particular a siliconized carrier, on or to one or more of the film elements of the one or more donor films, after step c). By a PSA adhesive layer is preferably meant an adhesive layer which is pressure-sensitive (PSA=pressure sensitive adhesive).

The thickness of a PSA adhesive layer preferably lies in the range of from 4 µm to 100 µm, preferably in the range of from 8 µm to 50 µm.

Further, it is possible for the further adhesive layer to be deposited on, preferably applied to, the receiver film or partial regions of the receiver film. The receiver film with the deposited film elements is preferably laminated onto the carrier by means of the further adhesive layer and the receiver film is optionally punched and weeded.

It has proved to be advantageous for a softening and/or activation of the further adhesive layer to be carried out after step c), in particular to join the film intermediate product to the target substrate, wherein the donor adhesive layer and/or the receiver adhesive layer is not softened.

Furthermore, it is possible for the donor adhesive layer and/or the receiver adhesive layer to be only partially softened, wherein functions and/or optical effects of the film intermediate product are in particular only slightly affected, preferably are not negatively affected, during the softening of the donor adhesive layer and/or the receiver adhesive layer.

The softening of the donor adhesive layer and/or of the receiver adhesive layer advantageously only slightly affects or does not affect the detachment force of the donor adhesive layer and/or of the receiver adhesive layer, with the result that the adhesion between the layers of the one or more film elements, the donor transfer plies, the receiver transfer ply and/or the receiver film remains.

Here, by functions and/or optical effects of the film intermediate product is meant in particular functions and effects of a decorative ply, functional ply, delamination ply and/or assistance layer.

Preferably, the softening temperature of the donor adhesive layer and that of the receiver adhesive layer differ, and/or the softening temperature of the donor adhesive layer and/or the softening temperature of the receiver adhesive layer differs from the softening temperature of the further adhesive layer.

It has proved to be advantageous for the softening temperature of the donor adhesive layer to be at least 2.5° C., in particular at least 5° C., preferably at least 7.5° C., below the softening temperature of the receiver adhesive layer.

Further, it has proved to be advantageous for the softening temperature of the further adhesive layer to be at least 2.5° C., in particular at least 5° C., preferably at least 7.5° C., below the softening temperature of the donor adhesive layer and/or of the receiver adhesive layer.

Furthermore, it has proved to be expedient for a softening of the further adhesive layer to be carried out, wherein the temperature of the donor adhesive layer and/or of the receiver adhesive layer is at least 2.5° C. lower, in particular at least 5° C. lower, preferably at least 7.5° C. lower, than the softening temperature of one of the one or more donor adhesive layers and/or of the receiver adhesive layer.

Further, it is possible for the donor adhesive layer to be crosslinked chemically and/or by radiation, in particular after step c), and/or for the softening temperature of the donor adhesive layer and/or receiver adhesive layer to be increased after step c).

In particular, the softening of the one or more donor adhesive layers and/or of the receiver adhesive layer is carried out, wherein no softening of the receiver detachment layer takes place and/or the adhesion between receiver transfer ply and receiver carrier ply is preserved through the receiver detachment layer.

Two or more of the film elements are preferably deposited in step c) in such a way that they partially overlap, completely overlap and/or do not overlap.

Thus, in particular, the advantage results that features of film elements can be arranged closer to one another in the film intermediate product and/or in an end product than would be possible in the case of a production on the same film.

Positioning tolerances of different features which are deposited on the receiver film with the film elements and/or are arranged on the receiver film are advantageously reduced. Thus, it is possible in particular to improve the register accuracy, for example of film elements relative to one another and/or of one or more film elements relative to the receiver film.

This is in comparison in particular with a production of film-based security features, wherein the production is effected in larger web widths of the receiver film and/or of the donor films, for example in web widths of between 500 mm and 2,000 mm. As, in particular, processing tools, for example for a replication or a printing, are typically rigid, these cannot react to distortions of a web. For example in the case of registered delivery of individual webs, in particular as donor films, local distortions can be continuously compensated for better, in particular if several donor films are used instead of only one donor film and/or the one or more donor films are narrower than the receiver film.

Thus, the one or more donor films are preferably narrower than the receiver film and the positioning, in particular the register accuracy, of each donor film is adjustable. Further, it is expedient if at least two donor films are provided as individual webs, which in each case have a smaller web width than the receiver film.

For example, it is also possible for the one or more film elements to be deposited on the receiver film such that register deviations already formed in the one or more donor films provided and/or in the receiver film provided have a positive effect on the register accuracy yet to be achieved in the film intermediate product by combining for example similar sequences of register deviations, in particular in the running direction, of a donor film and of the receiver film.

In particular, features which would mean incompatible production processes in the case of a production on only one film can be produced separately on the donor films and combined in the film intermediate product.

It is further possible for one or more of the film elements to be deposited in step c) in such a way that they overlap the receiver film only in regions.

In particular, the one or more film elements are deposited in step c) in such a way that they overlap in each case less than 5% of the surface of the receiver film. This results in particular in the advantage that less material is guided through the process and/or less waste accumulates.

The advantage is hereby achieved that, to produce the film intermediate product, there is less wastage of materials of the donor films, in particular in relation to the surface area of the respective film elements. Through the depositing of a donor film for example with a complexly printed feature, preferably with several printed layers and/or cost-intensive pigments and/or by means of cost-intensive printing processes, it is possible for example also to use very cost-intensive processes and to integrate the features produced therewith in a security element, as it is not necessary to process the whole surface of the receiver film with the cost-intensive process.

A donor film expediently covers only a surface area of from 0.2% to 20%, preferably a surface area of from 0.5% to 5%, of the receiver film in top view or when viewed perpendicular to the respective donor film and the respective receiver film when the respective film elements are deposited.

In particular, different decorative plies, functional plies and/or delamination plies can be arranged at a particularly small distance, which is not possible in the case of production on one film and/or can only be produced at higher cost, with more waste, with poorer protection against forgery and/or in lower quality.

By way of example, a film element has optical effects which have a very high replication quality, whereby high temperatures and a high pressure are necessary during the manufacture. The receiver film and/or a further film element has a delamination ply, which would be damaged by the high pressure and the high temperatures in the case of a manufacture of the optical effect on the same film.

Further, it is possible for a first optically active surface structure, in particular a surface relief, to be provided particularly close to a further optically active surface structure, in particular a further surface relief.

These two surface structures preferably overlap, in particular when viewed perpendicular to a plane spanned by the receiver carrier ply. Furthermore, it is possible for both surface reliefs to be provided at least partially with a reflective layer, in particular with a metallic reflective layer and/or with an HRI layer.

It is possible here for the further optically active surface structure to be used in particular in an etching process to manipulate the irradiation such that a metallization or demetallization is carried out register-accurately relative to the further optically active surface structure. If, during the irradiation, by way of example, the first optically active surface structure were to be arranged too close to the further optically active surface structure, it would negatively affect the irradiation or could have only limited optical effects.

Because of the disruptive effect of the first optically active surface structure during the irradiation, it is advantageous to produce it in a separate manufacturing step and to provide it in a different donor film and/or in the receiver film.

A singulation of the receiver film with the one or more film elements is preferably carried out after step c), in particular by cutting and/or punching.

It is furthermore possible for the receiver film, one or more of the film elements and/or one or more of the donor films to have one or more assistance layers, which have in particular one of the following or a combination of the following layers:

One or more adhesion-promoter layers. An adhesion-promoter layer in particular increases the adhesion of an adhesive layer which is arranged between one or more layers and the adhesion-promoter layer, wherein the adhesion is preferably to be produced between one or more layers joined to the adhesion-promoter layer and one or more layers joined to the adhesive layer.

The thickness of an adhesion-promoter layer preferably lies in the range 0.01 µm to 5 µm, preferably 0.02 µm to 2 µm.

One or more detachment layers. A detachment layer is preferably designed in such a way that a nondestructive separation of several layers joined together via the detachment layer is brought about when the detachment layer is activated, preferably by thermal and/or mechanical activation. By detachable is preferably meant that a join can be separated, wherein no layer and/or only the detachment layer is destroyed. The donor carrier ply can therefore be separated from the donor transfer ply nondestructively.

One or more protective layers. By a protective layer is meant in particular a layer which protects adjacent layers from external effects, in particular mechanical and/or thermal and/or chemical effects. For example, a protective layer protects adjacent layers from abrasion and/or oxidation. A protective layer can have for example a varnish layer.

One or more print-receiving layers. By a print-receiving layer is meant in particular a layer which improves the adhesion and/or the quality of a printed layer arranged thereon. For this, print-receiving layers have, for example, a specially formed porosity and/or roughness and/or surface energy.

An assistance layer has in particular a layer thickness of between 0.01 µm and 20 µm. These layers are preferably deposited partially or over the whole surface from a solution by means of a printing method. It is also possible for an assistance layer to have been or to be deposited by means of spraying, casting or injection molding. Furthermore, it is conceivable for an assistance layer to be radiation-cured, for example by means of UV radiation and/or electron radiation.

It has proved to be advantageous for the decorative ply of the receiver film to have at least one first decorative element. The decorative ply of the receiver film preferably has a plurality of first decorative elements, which are in particular provided in a regular one- or two-dimensional grid in the decorative ply.

Further, it is possible for the one or more film elements in each case to have one or more second decorative elements or in each case to form a second decorative element, wherein the first and second decorative elements differ from one another. In particular, in each case a first and a second decorative element are arranged next to one another.

It has proved to be advantageous for an adhesive layer to be used to join the film intermediate product to a target substrate, preferably to act as a compensation layer, in particular for this adhesive layer to flow when the film intermediate product is joined to the target substrate, wherein in particular the shape of the surface of this adhesive layer is levelled. By levelled is meant here in particular that the shape of the surface of this adhesive layer is adapted to the shape of the target substrate.

A compensation layer is used in particular to conceal differences in thickness of a film. Further, during an application of the film intermediate product to a target substrate, a compensation layer is advantageously provided to reduce pressure and/or stress peaks and/or to prevent an unwanted flowing and/or a tearing of other layers of the film.

It is preferably provided that the film intermediate product is used to produce a surface of the product. In particular, the film intermediate product is applied to a target substrate.

It is furthermore possible for the receiver carrier ply to be detached from the receiver transfer ply after the film intermediate product has been applied to the target substrate, in particular wherein the receiver transfer ply has a surface relief on the surface uncovered thereby.

Further, it is possible for the film intermediate product to be applied to the target substrate by injection of an injection-molding compound, in particular wherein the injection-molding compound forms the target substrate.

It has proved to be advantageous if the receiver film here has a detachable receiver carrier ply, preferably having a polyester carrier.

In particular, a side facing away from the respective donor carrier ply of a donor transfer film before the depositing in step c) forms a side facing away from the target substrate in the product. This side preferably forms a surface of the product that is visible to an observer.

It is further possible for a side of the film intermediate product facing away from the target substrate to form a side of a donor transfer film which is provided facing away from the donor carrier ply before the depositing in step c). In particular, this is a side of a metal layer, wherein the metal layer has properties on the side facing away from the target substrate different from those on the side facing the target substrate. On the side facing away from the target substrate, this metal layer preferably has a further layer, which is arranged exactly registered relative to the metal layer through a demetallization by means of etching methods. This further layer is in particular a coloring of the metal layer through a layer used as etch resist in the etching method. It is possible here for the layer used as etch resist to be for example a colored varnish layer. The colored varnish layer is expediently transparent and/or semi-transparent. Thus, it is possible in particular for the metal layer to have a coloring for a person observing the product, preferably looking at the metal layer through the colored varnish layer.

BRIEF DESCRIPTION OF THE DRAWINGS

In the following, the invention is explained with reference to several embodiment examples utilizing the attached drawings by way of example.

DETAILED DESCRIPTION

Figure 1A:
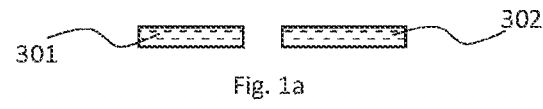
FIG. 1a shows a schematic sectional representation of donor films.

FIG. 1a shows two donor films 301, 302. It is possible here for at least one of the donor films 301, 302 to be a donor transfer film, preferably a hot-stamping, cold-stamping, and/or a thermal-transfer film, and/or to be a donor laminating film. It is further possible for the donor films 301, 302 to be designed similar and/or different from one another.

It is preferably possible for the donor films 301, 302 in each case to comprise one or more assistance layers 11a, at least one decorative ply 4a, a delamination ply and/or at least one functional ply 5a.

Figure 1B:
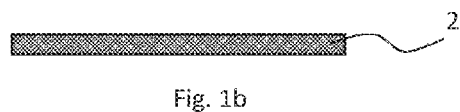
FIG. 1b shows a schematic sectional representation of a receiver film.

FIG. 1b shows a receiver film 2. It is possible here for the receiver film to be a receiver transfer film, preferably a hot-stamping film or cold-stamping film or thermal-transfer film, or for the receiver film 2 to be a receiver laminating film.

It is possible for the receiver film 2 to comprise a receiver carrier ply 21, a decorative ply 4b, a delamination ply and/or a functional ply 5b.

A decorative ply 4a, 4b in each case has one of the following or a combination of the following layers, in particular in each case over the whole surface and/or over part of the surface:

one or more varnish layers, one or more layers containing a liquid-crystal material, one or more layers containing a thin-film system, one or more metallic layers, one or more volume hologram layers, one or more layers having an optically active surface structure or an optically active surface relief, one or more reflective layers 10a, 10b.

Further, it is possible for the receiver film 2 to have one or more assistance layers 11b. An assistance layer 11a, 11b has in particular one of the following or a combination of the following layers:

one or more adhesion-promoter layers, one or more detachment layers, one or more protective layers and/or one or more print-receiving layers.

Figure 1C:
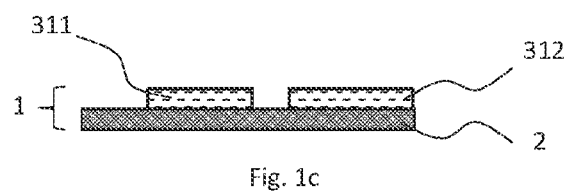
FIG. 1c shows a schematic sectional representation of a film intermediate product.

FIG. 1c shows by way of example a film intermediate product 1 comprising the receiver film 2 depicted in FIG. 1b and two film elements 311, 312, which are in each case formed of a cutout of the donor films 301, 302 depicted in FIG. 1a and which are deposited on the receiver film 2.

FIG. 1a to FIG. 1c thus show a method for producing a film intermediate product 1. FIG. 1b shows step a), providing a receiver film 2. FIG. 1a shows step b), providing one or more donor films, wherein two donor films 301, 302 are provided here in particular. FIG. 1c shows the depositing of one or more film elements, which is or are formed in each case of a cutout of one of the one or more donor films, on the receiver film 2 from FIG. 1a, wherein the film elements 311, 312 are in each case formed of a cutout of the donor films 301, 302 here in particular.

Here, the steps can in particular be carried out once and/or multiple times in any order, preferably in the above-named order.

It is thus possible for a film element 311, 312 to be formed of a cutout of a donor transfer film, in particular a cutout of a hot-stamping film, a cold-stamping film and/or a thermal-transfer film. Further, it is also possible for a film element 311, 312 to be formed of a cutout of a donor laminating film.

In particular, it is possible for the cutout of a donor film forming a respective film element 311, 312 to comprise the entire donor film 301, 302 or only one part and/or several parts of a donor film 301, 302.

The film intermediate product 1, when viewed perpendicular to a plane spanned by the film intermediate product, preferably in top view starting from the sectional representation shown here, preferably has at least two, preferably different, directly adjoining, at least partially overlapping and/or neighboring film elements, which would be incompatible in the case of manufacture on one film and/or would at least mean an increase in the manufacturing time, a reduction in the quality of the features and/or more waste and/or higher production costs.

Figure 2A:
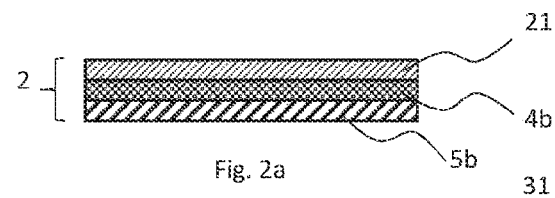
FIG. 2a shows a schematic sectional representation of a receiver film.

FIG. 2a shows a receiver film 2, which comprises a receiver carrier ply 21, a decorative ply 4b and a functional ply 5b. The receiver carrier ply 21 preferably consists of PET, BOPP, PEN, PMMA, PC, ABS, PU, PVC and/or glass, and has in particular a layer thickness of from 5 µm to 150 µm, preferably 10 µm to 75 µm.

The decorative ply 4b is arranged between the receiver carrier ply 21 and the functional ply 5b here by way of example. It is also possible for the functional ply 5b to be arranged between the decorative ply 4b and the receiver carrier ply 21.

Further, it is possible for the receiver film 2 to have at least one delamination ply 18 and/or at least one assistance layer 11b.

With respect to the design of the plies or layers, as well as further plies or layers, reference is made to the above embodiments.

Figure 2B:
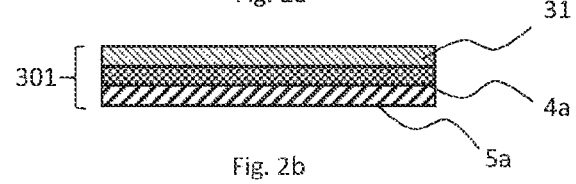
FIG. 2b shows a schematic sectional representation of a donor film.

FIG. 2b shows a donor film 3, which comprises a donor carrier ply 31, a decorative ply 4a and a functional ply 5a. The donor carrier ply 31 preferably consists of PET, BOPP, PEN, PMMA, PC, ABS, PU, PVC and/or glass, and has in particular a layer thickness of from 5 µm to 150 µm, preferably 5 µm to 75 µm, further preferably 5 µm to 50 µm.

The decorative ply 4a is arranged between the donor carrier ply 31 and the functional ply 5a here by way of example. It is also possible for the functional ply 5a to be arranged between the decorative ply 4a and the donor carrier ply 31.

Further, it is possible for the donor film 301 to have at least one delamination ply 18 and/or at least one assistance layer 11b.

Thus, it is further possible for the one or more film elements 311 to 314 formed in each case of a cutout of one of the one or more donor films 301 to have at least one decorative ply 4a and/or at least one functional ply 5a and/or a delamination ply 18.

With respect to the specific design of the plies or layers, as well as further plies or layers, reference is made in particular to the above embodiments.

Figure 3A:
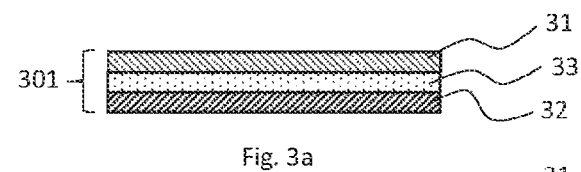
FIG. 3a shows a schematic sectional representation of a donor film.

FIG. 3a shows a donor film 301 comprising a donor carrier ply 31, a donor transfer ply 32 and a donor detachment layer 33.

The donor detachment layer 33 is preferably arranged between the donor carrier ply 31 and further layers of the donor film 301.

Here, the donor transfer ply 32 preferably comprises one or more of the above-described assistance layers 11a, decorative plies 4a, functional plies 5a and/or delamination plies 18.

The donor detachment layer 33 has the properties of a detachment layer. A detachment layer comprises in particular one or more wax layers. Further, a detachment layer preferably has an adhesive layer. In particular, the donor carrier ply 31 is detachable from the donor transfer ply 32 through the donor detachment layer 33.

The donor carrier ply 31 can in particular be separated from the donor transfer ply 32 nondestructively. Further, it is possible for a shaping of a film element 311, 312 transferred by means of the donor transfer ply 32 to take place during the detachment.

With respect to the specific design of the plies or layers, as well as further plies or layers, reference is made in particular to the above embodiments.

Figure 3B:
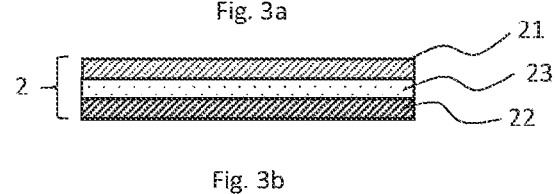
FIG. 3b shows a schematic sectional representation of a receiver film.

FIG. 3b shows a receiver film 2 comprising a receiver carrier ply 21, a receiver transfer ply 22 and/or a receiver detachment layer 23.

The receiver detachment layer 23 is preferably arranged between the receiver carrier ply 21 and further layers of the receiver film 2.

Here, the receiver transfer ply 22 preferably comprises one or more of the above-described assistance layers 11a, decorative plies 4b, functional plies 5b and/or delamination plies 18.

Further, it is possible for the receiver transfer ply 22 to have a transparent layer, in particular a layer that is transparent at least in a partial region in the UV range with a wavelength of from 400 nm to 240 nm and/or for the human eye, and/or a color layer which is preferably printed on.

With respect to the design of the receiver detachment layer 23, reference is made to the above embodiment of a detachment layer.

In particular, the receiver carrier ply 21 is detachable from the receiver transfer ply 22 through the receiver detachment layer 23. The receiver carrier ply 21 can therefore be separated from the receiver transfer ply 22 nondestructively.

Further, it is possible in particular for a shaping of the receiver transfer ply 22 to take place when the receiver transfer ply 22 is detached from the receiver carrier ply 21.

With respect to the specific design of the plies or layers, as well as further plies or layers, reference is made in particular to the above embodiments.

Figure 3C:
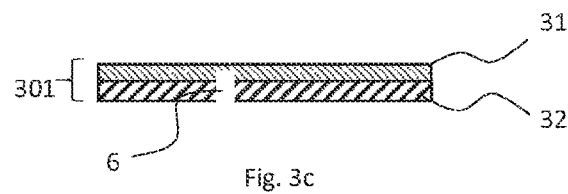
FIG. 3c shows a schematic sectional representation of a donor film.

FIG. 3c shows a donor film 301 with a donor transfer ply 32 and a donor carrier ply 31. Here, the donor film 301 or the donor carrier ply 31 has a recess 6, which is introduced through the donor transfer ply 32 and partially into the donor carrier ply 31.

Instead of the recess 6, the donor film 301 preferably has a void and/or a complete and/or partial severance 7a of the donor carrier ply 31 and/or of the donor transfer ply 32 and/or has additional severances 7a and/or recesses 6 of the donor carrier ply 31 and/or of the donor transfer ply 32.

With respect to the design of the plies or layers, as well as further plies or layers, reference is made to the above embodiments.

Figure 3D:
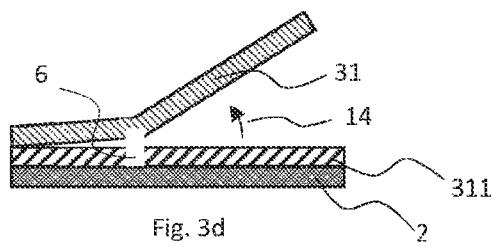
FIG. 3d shows a schematic sectional representation of a detachable donor carrier ply of a donor film applied to a receiver film.

FIG. 3d shows a donor film 301, which was described in FIG. 3c. In the embodiment example shown here, the donor film 301 is a donor transfer film and the donor transfer ply 32 is detachable from the donor carrier ply 31.

Here, the donor film 301 or the donor carrier ply 31 has an optional recess 6, which is introduced into the donor transfer ply 32 and partially into the donor carrier ply 31.

It is likewise possible for no recesses 6 to be provided and/or for severances 7a and/or voids to be provided instead of the recesses 6.

Further, the donor film 301 is joined to a receiver film 2 by way of example here. The donor carrier ply 31 is preferably detached from the donor transfer ply 32 at least in regions, wherein in particular a first partial region of the donor transfer ply 32 remains as a film element 311 on the receiver film.

Preferably, the donor film 301 is a donor transfer film, which is in particular a hot-stamping film, and the receiver film 2 is a receiver transfer film, which is in particular a hot-stamping film.

Further film elements are preferably formed from cutouts of the donor film 301, which is a donor transfer film, and/or from further one or more donor films 302, 303, 304.

Rolls are preferably used to set the peeling angle 14. In particular, it has proved worthwhile to peel the donor film 301 off over an edge. In particular, very pointed edges, preferably with a small angle between the faces, are particularly advantageous, as they allow for example a narrowly localized peel location with a large peeling angle, preferably up to 180°. Mechanical separation aids are preferably used for a sharp-edged breaking of the donor transfer plies 32.

In particular, recesses 6, severances 7a, 7b and/or voids are provided and/or a peeling angle 14 of between 30° and 180°, preferably 90° and 180°, is set.

In particular, a smaller detachment force for detaching the donor carrier ply 31 from the donor transfer ply 32 deposited on the receiver film 2 is hereby achieved than without recesses 6, severances 7a, 7b and/or voids and/or at different peeling angles. In particular, relatively small thermal and/or mechanical loads are thereby produced on the donor transfer plies 32 and/or the receiver film 2, which is preferably a receiver transfer film, preferably is a hot-stamping film.

This is true in particular in the case of a hot stamping of one or more donor films 301 to 304 as hot-stamping films onto a receiver film 2 as hot-stamping film.

Through a suitable process control, in particular in the case of a cold stamping and/or hot stamping, in step c), it has surprisingly been shown that even donor transfer plies 32 with relatively large detachment forces can be deposited on a receiver film 2, which is preferably a receiver transfer film, the receiver transfer plies of which have small detachment forces, without the receiver transfer ply 22 being or having been detached from the receiver carrier ply 21 and/or a desired function in the film intermediate product 1 being lost, for example the function of a delamination ply.

With respect to the specific design of the plies or layers, as well as further plies or layers, reference is made in particular to the above embodiments.

Figure 3E:
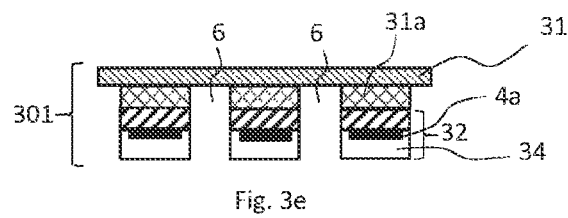
FIG. 3e shows a schematic sectional representation of a donor transfer film.

FIG. 3e shows by way of example a donor film 301 with a donor carrier ply 31, a further donor carrier ply 31a and a donor transfer ply 32, wherein recesses 6 are introduced into the further donor carrier ply 31a, with the result that the donor film 301 is preferably coated on a receiver film 2 like the donor film 301 described in FIG. 3d and the donor carrier ply 31 and/or the further donor carrier ply 31a is advantageously detached.

Further, the donor transfer ply 32 comprises a donor adhesive layer 34, which is preferably used to deposit the respective donor transfer ply 32, which preferably forms a cutout of the donor film 301 forming one or more film elements 311 to 314, on the receiver film 2. The donor transfer ply 32 preferably has a decorative ply 4a, which is formed by a printed layer by way of example here.

Further, it is possible for the further donor carrier ply 31a to be designed detachable from the donor carrier ply 31, in such a way that the further donor carrier plies 31a, preferably after the respective donor film 301 has been deposited on a receiver film 2 and after the donor carrier ply 32 has subsequently been detached from one or more first partial regions of the respective donor transfer ply 32 at least in regions, remain as film elements on the receiver film 2.

Further, it is possible in particular for the donor film 301 with the further donor carrier ply 31a to form voids at the locations of the recesses 6, wherein the further donor carrier ply 31a with the voids is applied to the donor carrier ply 31, preferably with a donor transfer ply 32 arranged on the further donor carrier ply 31a.

In particular, the donor carrier ply 31 and/or the further donor carrier plies 31a is or are a PET carrier.

With respect to the specific design of the plies or layers, as well as further plies or layers, reference is made in particular to the above embodiments.

Figure 3F:
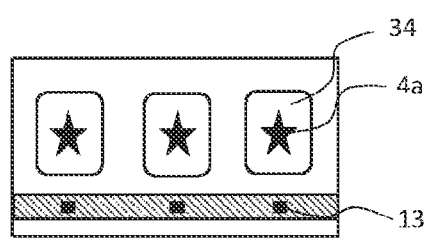
FIG. 3f shows a schematic view from below of the film shown in FIG. 3e.

FIG. 3f shows by way of example the donor film shown in FIG. 3e in a view from below. Further, register marks 13 are deposited by way of example here.

With respect to the specific design of the plies or layers, as well as further plies or layers, reference is made in particular to the above embodiments.

Figure 4A:
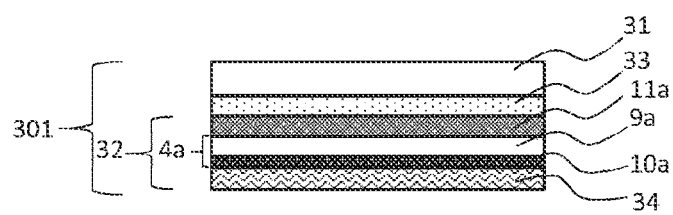
FIG. 4a shows a schematic sectional representation of a donor film.

FIG. 4a shows by way of example a donor film 302 with a donor carrier ply 31, a donor detachment layer 33 and a donor transfer ply 32, which has an optional donor adhesive layer 34, wherein the donor adhesive layer 34 is preferably a heat-seal adhesive layer, which is activated by means of pressure and heat.

The pressure and the heat in step c) are preferably generated by means of hot stamping by a heated stamping die. Further, the donor transfer ply 32 has a decorative ply 4a, preferably with a replication layer 9a, into which in particular at least one optically active surface structure is introduced, and which is preferably arranged between the optional donor adhesive layer 34 and the donor detachment layer 33.

Further, the decorative ply 4a has, between the replication layer 9a and the optional donor adhesive layer 24, a reflective layer 10a, preferably a metallic reflective layer, which is in particular partially deposited, preferably is at least partially deposited on the at least one optically active surface structure of the replication layer 9a.

Further, it is possible for the donor transfer ply to have an assistance layer 11a between the donor detachment layer 33 and the replication layer 9a.

With respect to the specific design of the plies or layers, as well as further plies or layers, reference is made in particular to the above embodiments.

Figure 4B:
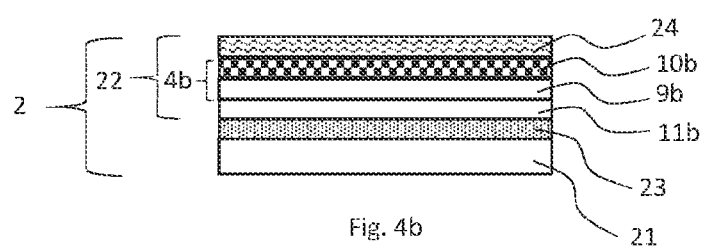
FIG. 4b shows a schematic sectional representation of a receiver film.

FIG. 4b shows by way of example a receiver film 2 with a receiver carrier ply 21, a receiver detachment layer 23 and a receiver transfer ply 22, which has in particular a receiver adhesive layer 24.

Further, the receiver transfer ply 22 has in particular a decorative ply 4b, preferably with a reflective layer 10b, which preferably has an HRI layer and/or has a partially transparent HRI layer, and which is arranged between the optional receiver adhesive layer 24 and the receiver detachment layer 23.

An HRI layer (HRI=High Refractive Index) is a layer with a high refractive index, in particular with a refractive index of more than 1.5, preferably of more than 1.7.

Further, the decorative ply 4b preferably has a replication layer 9b, into which in particular at least one further optically active surface structure is introduced, and which is arranged between the reflective layer 10b and the receiver detachment layer 23.

The receiver transfer ply 22 in addition preferably has an assistance layer 11b between the replication layer 9b and the receiver detachment layer 23. In particular, the receiver transfer ply 22 forms a diffractive feature, preferably a diffractive security feature.

Further, it is possible for the reflective layer to have a thin-film system.

The receiver film 2 is preferably a receiver transfer film, wherein the receiver transfer ply 22 is detachable from the receiver carrier ply 21, wherein the detachment or the separation of the receiver transfer ply 22 from the receiver carrier ply 21 is preferably ensured by a detachment layer 23, which comprises one or more wax layers.

The reflective layer 10b is preferably at least partially deposited on the at least one further optically active surface structure of the replication layer 9b.

A receiver adhesive layer 24, preferably a heat-seal adhesive layer, which is activated by means of pressure and heat, is preferably arranged on the reflective layer 10b. The pressure and the heat in step c) are preferably generated by means of hot stamping by a heated stamping die.

It is possible for the receiver adhesive layer 24 to have an adhesion-promoter layer, which is preferably used to improve the binding of the receiver adhesive layer 24 to the reflective layer.

Further, it is possible for the receiver adhesive layer 24 in particular to be partially coated on, preferably to be coated individually onto one or more first partial regions. The receiver adhesive layer 24 is preferably radiation-curable. Here, step c) is preferably carried out by means of cold stamping, wherein the one or more donor films are joined to the receiver adhesive layer 24 and the adhesive is cured by means of irradiation.

During the detachment of the respective donor carrier ply 31, the donor transfer plies arranged in the one or more first partial regions on which the receiver adhesive layer 24 is arranged expediently remain adhering as film elements 311 to 314 to the receiver film 2.

With respect to the specific design of the plies or layers, as well as further plies or layers, reference is made in particular to the above embodiments.

Figure 5:
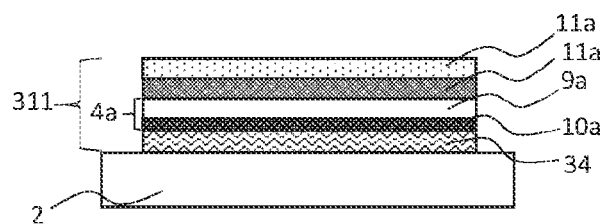
FIG. 5 shows a schematic sectional representation of a donor transfer ply on a receiver film.

FIG. 5 shows by way of example the donor transfer ply 32 depicted in FIG. 4a, which is deposited on a receiver film 2 and thus forms a cutout of the donor film 301 forming a film element 311. Here, for example, an upper assistance layer 11a can be provided on the donor transfer ply 32 and/or the film element 311, which is arranged on the outermost side facing away from the receiver film 2.

In particular, the upper assistance layer 11a has an adhesive layer, which is preferably an adhesive layer of the donor detachment layer 33 of the respective donor film 301, which forms the film element 311.

The donor detachment layer 33 preferably further has at least one wax layer, with the result that this adhesive layer remains on the donor transfer ply 32 and as a layer of the film element 311 on the receiver film 2 when the donor carrier ply 31 is detached from the donor transfer ply 32. This adhesive layer is then in particular used to join the film intermediate product 1 to a target substrate.

Here, the shape of the deposited film element 311 is in particular determined by the shape of the stamping die during a hot stamping in step c).

Further, it is possible for the shape of the deposited film element 311 to be determined in that the adhesive layer is printed during a cold stamping in step c), in particular in that, in step c), an adhesive layer is printed, in particular by means of a digital printing method, onto the donor film 301 and/or onto the receiver film 2 in one or more first partial regions 20b, but is not printed on in one or more second partial regions.

Further, it is preferably possible for the shape of the film element 311 to be determined by recesses 6, severances 7a, 7b and/or voids, as is described in particular in FIG. 3d, FIG. 3e and FIG. 3f.

Further, it is possible for the receiver film 2 to be a receiver transfer film with a receiver transfer ply 21, wherein the film element 311 or further film elements are deposited on the receiver transfer ply 21.

With respect to the specific design of the plies or layers, as well as further plies or layers, reference is made in particular to the above embodiments.

Figure 6:
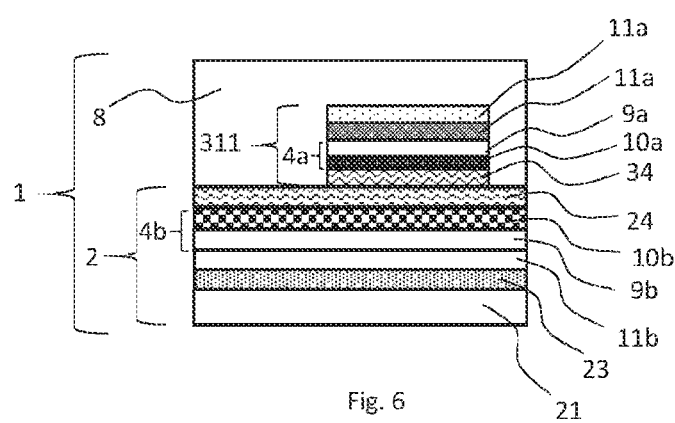
FIG. 6 shows a schematic sectional representation of a film intermediate product.

FIG. 6 shows by way of example a film intermediate product 1, wherein a film element 311 from a cutout of a donor transfer ply 32 as described in FIG. 5 is deposited on a receiver film 2 as described in FIG. 4b.

Here, a further adhesive layer 8, which is single- or multi-layered and is preferably used to join the film intermediate product 1 to a target substrate, is applied to the receiver film 2 and the donor transfer ply 32 or the film element 311.

It has proved to be advantageous if the softening temperature of the donor adhesive layer 34 and that of the receiver adhesive layer 24 differ, and/or if the softening temperature of the donor adhesive layer 34 and/or the softening temperature of the receiver adhesive layer 24 differs from the softening temperature of the further adhesive layer 8, in particular if the softening temperature of the donor adhesive layer 34 is at least 2.5° C., preferably at least 5° C., preferably at least 7.5° C., below the softening temperature of the receiver adhesive layer 24.

Further, it has proved to be advantageous for the softening temperature of the further adhesive layer 8 to be at least 2.5° C., in particular at least 5° C., preferably at least 7.5° C., below the softening temperature of the donor adhesive layer 34 and/or the receiver adhesive layer 24, and/or for a softening of the further adhesive layer 8 to be carried out, wherein the temperature of the donor adhesive layer 34 and/or of the receiver adhesive layer 24 is at least 2.5° C. lower, in particular is at least 5° C. lower, preferably is at least 7.5° C. lower, than the softening temperature of the respective donor adhesive layer 34 or receiver adhesive layer 24.

Further, it is possible for the donor adhesive layer 34 to be crosslinked chemically and/or by radiation, in particular after step c), and/or for the softening temperature of the donor adhesive layer 34 and/or receiver adhesive layer 24 to be increased after step c).

With respect to the specific design of the plies or layers, as well as further plies or layers, reference is made in particular to the above embodiments.

Figure 7:
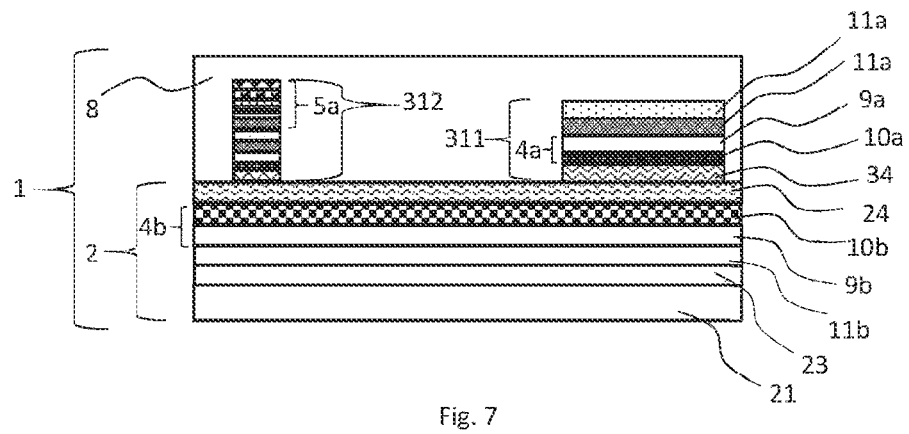
FIG. 7 shows a schematic sectional representation of a film intermediate product.

FIG. 7 shows by way of example a film intermediate product 1, which has a further film element 312 in addition to the film intermediate product 1 represented in FIG. 6. This film element 312 has, in particular in addition to the film element 311 described in FIG. 5, a functional ply 5a.

In particular, it is possible for further film elements, which preferably have a decorative layer 4a, a functional ply 5a, an assistance layer 11a and/or a delamination ply 18, to be deposited on the receiver film 2, preferably in any arrangement. In particular, it is also possible for a film element 314 to have a printed layer with luminescent, preferably fluorescent, dyes.

A film intermediate product 1, which has at least one functional ply 5a, 5b, is preferably applied to the target substrate by injection of an injection-molding compound, wherein in particular the injection-molding compound forms the target substrate.

Here, the film intermediate product 1 is preferably used as an insert sheet, in particular with a width of from 10 mm to 800 mm, a length of from 15 mm to 1,200 mm and a thickness of from 20 μm to 300 μm.

With respect to the specific design of the plies or layers, as well as further plies or layers, reference is made in particular to the above embodiments.

Figure 8:
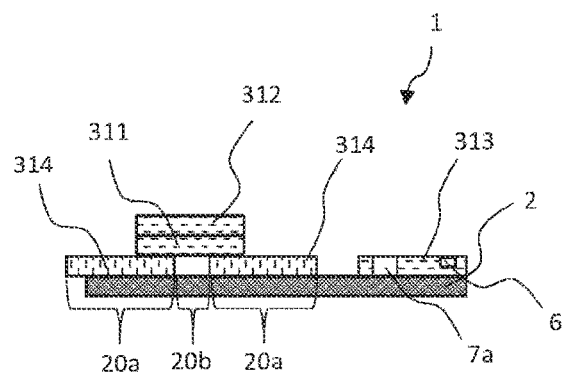
FIG. 8 shows a schematic sectional representation of a film intermediate product.

FIG. 8 shows by way of example a possible arrangement of film elements 311 to 314 on the receiver film.

Further, a severance 7a and a recess 6 of a film element 313 are shown by way of example.

Further, it is possible in particular for a donor carrier ply 31 of a donor film 304 not depicted here to be detached in such a way that first partial regions 20a remain as film elements 314 on the receiver film 2 when the donor carrier ply 31 is detached at least in regions, and optionally second partial regions 20b of the donor transfer ply 32 are peeled off with the donor carrier ply 31. The film elements 314 are preferably similar and/or different from one another. Further, it is possible for the film elements 314 to be arranged by way of example in a regular one- or two-dimensional grid.

It has proved to be advantageous for severances 7a, 7b and/or recesses 6 to be introduced at least into the one or more donor films 301 to 304, in particular into the donor transfer ply 32, wherein the severances 7a, 7b and/or recesses 6 are preferably introduced between the first and second partial regions 20a, 20b of the respective donor transfer ply 32.

With respect to the specific design of the plies or layers, as well as further plies or layers, reference is made in particular to the above embodiments.

Figure 9A:
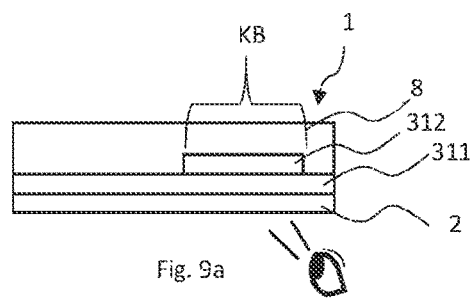
FIG. 9a shows a schematic sectional representation of a film intermediate product.

FIG. 9a shows by way of example a film intermediate product 1, which has a film element 311 deposited on a receiver film 2. A further film element 312 is arranged on this film element 311.

Furthermore, a further adhesive layer 8 is deposited, which is preferably deposited on the two film elements 311 and 312. Further, it is possible in particular for the further adhesive layer 8 also to be in contact with the receiver film 2.

The receiver film 2 is preferably not detachable, preferably not detachable and at least partially transparent, preferably at least partially transparent in the UV range and/or a range visible to the human eye. It is in particular further possible for the receiver film 2 to be at least partially detachable, preferably for the receiver film 2 to have a detachable receiver carrier ply 21.

A film element 311 is preferably partially overlapped by another film element 312. The partially overlapped film element 311 preferably overlaps the other film element 312 completely and/or partially.

Further, optical effects of the further film element 312 are at least partially recognizable through the partially overlapped film element 311, preferably at least partially visible with the human eye.

In particular, the partially overlapped film element 311 has a replication layer at least in a region overlapped by the further film element 312.

The partially overlapped film element 311 preferably has, on its side facing away from the receiver film 2, a layer which is in contact with a side of the further film element 312 facing the receiver film 2, whereby a contact region KB is formed.

Between the layer of the partially overlapped film element 311 and the layer of the further film element 312 in contact with this layer, the difference in refractive index is preferably smaller than or equal to 0.2, preferably smaller than 0.1.

It is further possible for the difference in refractive index to be smaller than 0.2, preferably to be smaller than 0.1. This is at least in 50% of the contact region KB. In particular, an HRI layer and/or a metal layer is provided in the remaining regions of the contact region KB.

Further, it is possible for the difference in refractive index to be larger than 0.3, preferably to be larger than 0.5, wherein in particular an HRI layer is provided.

With respect to the specific design of the plies or layers, as well as further plies or layers, reference is made in particular to the above embodiments.

Figure 9B:
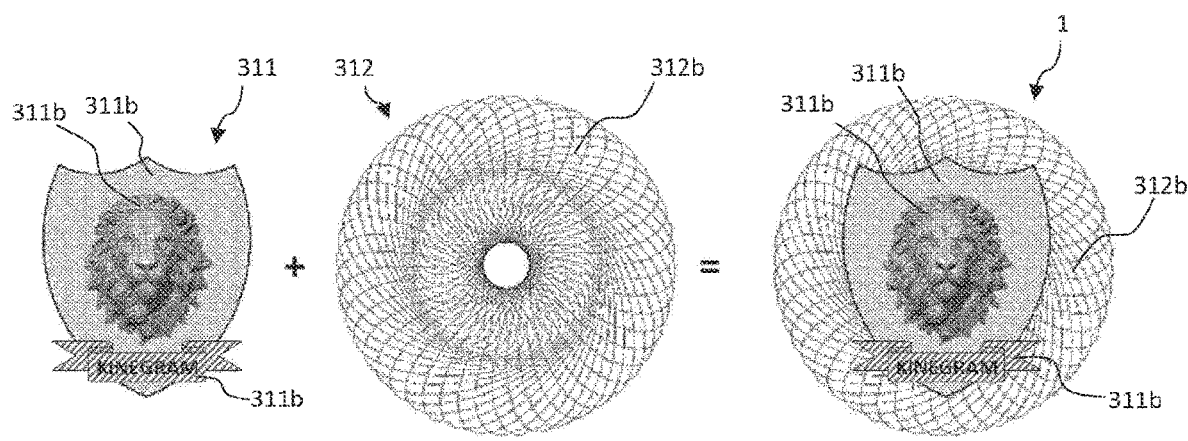
FIG. 9b shows a view from below of a film intermediate product.

FIG. 9b shows a specific design example, which can be produced with the structure from FIG. 9a. A film element 311, deposited on a receiver film 2, a film element 312 as well as a film intermediate product 1, in which the film element 312 is deposited on the receiver film 2, and in particular on the film element 311, such that it partially overlaps with the film element 311, are to be seen.

It is in particular also possible for the film element 312 to be deposited on a receiver film 2 and for the film element 311 in the film intermediate product 1 to be deposited on the receiver film 2, and in particular the film element 312, such that it partially overlaps with the film element 312.

The receiver film 2 is expediently preferably transparent and/or in particular not depicted here.

Here, the film intermediate product 1 is shown, in particular starting from FIG. 9a in a view from below. An observer thus looks, in particular when viewing perpendicular to a plane spanned by the film intermediate product 1, through the receiver film 2 and/or through the receiver carrier ply 21 and/or through the receiver transfer ply 22, onto the film elements 311, 312 of the film intermediate product 1.

The decorative ply 4a of the film element 311 has several layers 311b provided over part of the surface. The layers 311b provided over part of the surface are in each case preferably arranged in the form of a pattern, wherein the patterns are in particular formed in the shape of a coat of arms, a lion's head and a banner with the lettering "Kinegram".

A reflective layer, in particular a metallic reflective layer, for example made of aluminum, is expediently arranged on the layers 311b provided over part of the surface, wherein the reflective layer is preferably arranged only in the layers 311b provided over part of the surface.

The layers 311b provided over part of the surface preferably have optically variable effects. The layers provided over part of the surface thus expediently comprise in each case optically active surface structures, which in particular have microstructures.

Further, the film element 311 preferably has a coloring. The coloring is preferably formed of a glazing varnish layer, which is expediently arranged between the receiver film 2 and the partially provided layers, with the result that the partially provided layers 311b for example appear in gold colors, in particular when the film element 311 is viewed in the product 100.

The film element 311 and/or the receiver film 2 is transparent or semi-transparent at least over part of the surface, at least outside the layers provided over part of the surface.

For example, for this purpose the decorative ply 4a of the film element 311 has a transparent or semi-transparent layer, which is in particular a varnish layer which is arranged at least outside the layers provided over part of the surface.

It is in particular also possible for the decorative ply 4a of the film element 311 to have a transparent or semi-transparent layer, which is in particular a varnish layer, and/or a further transparent or semi-transparent layer, which is in particular a varnish layer, which is arranged on the layers provided over part of the surface.

Further, it is expedient if the receiver film 2, in particular the receiver transfer ply 22 and/or the receiver carrier ply 21, has a transparent or semi-transparent layer, which is in particular a varnish layer or a plastic layer.

Regions of the film element 312 which do not overlap with the reflective layer of the film element 311 are thus recognizable for the observer, in particular when viewed perpendicular to a plane spanned by the film intermediate product 1, in particular recognizable in the film intermediate product 1 and/or in the product 100.

The film element 312 preferably has optically variable effects. In particular, the film element 312 has a decorative ply 4a with a layer 312b provided over part of the surface, which preferably comprises a metal layer, for example made of aluminum, and in particular acts as a reflective layer. The layer 312b provided over part of the surface is expediently arranged in the form of a pattern, preferably the layer 312b provided over part of the surface forms partially metallized lines. The partially metallized lines preferably form a guilloche.

Optically active surface structures, in particular microstructures, are expediently provided in the layer 312b of the film element 312 provided over part of the surface. The optically active surface structures, in particular the microstructures, generate for example a sequential illumination of the lines, in particular as an apparent movement effect.

As the coloring of the film element 311, in particular the glazing varnish layer of the film element 311, is not present in the layer 312b of the film element 312 provided over part of the surface, in particular the partially metallized regions of the film element 312, the layer 312b of the film element 312 provided over part of the surface appears in a different color from the partially provided layers 311b of the film element 311. In particular, the guilloche of the film element 312 appears silver.

For a person observing the film intermediate product 1 and/or the product 100, there are thus no gaps, in particular when viewed perpendicular to a plane spanned by the film intermediate product 1, between the layers 311b provided over part of the surface and the layer 312b provided over part of the surface, in particular between the gold-colored layers 311b provided over part of the surface and the silver-colored guilloche.

Figure 10A:
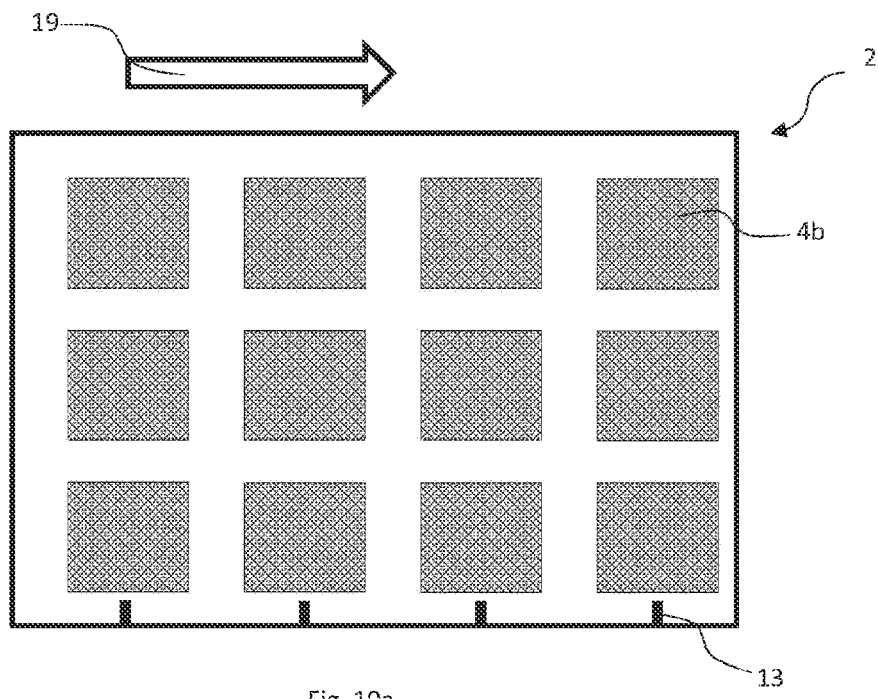
FIG. 10a shows a top view of a provision of a receiver film.

FIG. 10a shows a possible step a), providing a receiver film 2, in a top view. In particular, the receiver film 2 is provided with the running direction 19 represented, preferably in a roll-to-roll method. For example, the receiver film 2 already has decorative plies 4b.

The receiver film 2 preferably has register marks 13, which are in particular printed, diffractive and/or partially metallized, for a register-accurate depositing of further layers and/or one or more film elements 311, 312, 313, 314. It is furthermore possible for register marks to be arranged transverse to the running direction 19. Further, it is possible for layers of the receiver film 2 to take on the function of register marks, preferably diffractive elements of the receiver film 2. Further, it is possible for the receiver film 2 to have one or more decorative plies 4b, functional plies 5b and/or delamination plies.

With respect to the design of these plies, reference is made here in particular to the above embodiments.

Figure 10B:
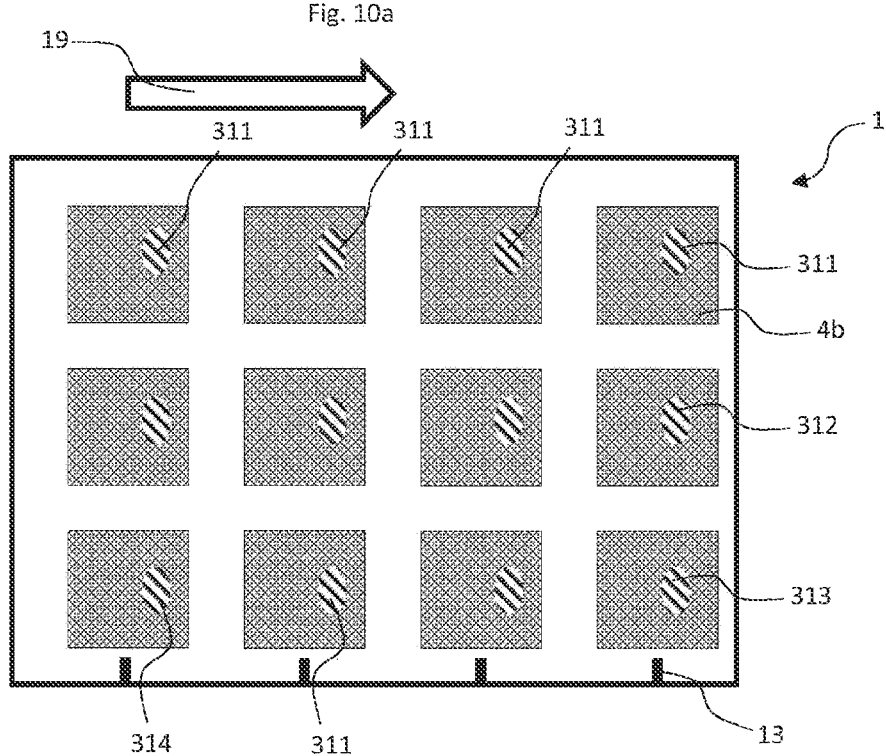
FIG. 10b shows a depositing of film elements on a receiver film.

FIG. 10b shows a possible step c), depositing one or more film elements 311, 312, 313, 314, which is or are formed in each case of a cutout of one of the one or more donor films 301, 302, 303, on the receiver film 2. Here, for example, the depicted film intermediate product 1 is produced, which has a receiver film 2 described by way of example in FIG. 10a and various film elements 311, 312, 313, 314. The film elements 311, 312, 313, 314 are preferably deposited register-accurately.

A film intermediate product 1 preferably has similar and/or different film elements 311, 312, 313, 314 transverse to the running direction 19.

However, it is also possible for further film elements to be deposited on the depicted receiver film 2 with the deposited film elements 311 to 314 before the film intermediate product 1 is produced, and/or for the film intermediate product 1 to be used as a donor film 301 to 304 or receiver film 2 in a method for producing a film intermediate product 1.

Here, it is preferably possible for the receiver film 2 to be a hot-stamping film and for step c) to be carried out by means of hot stamping, wherein at least one of the one or more donor films 301 to 304 is expediently a hot-stamping film.

With respect to the specific design of the plies or layers, as well as further plies or layers, reference is made in particular to the above embodiments.

Figure 10C:
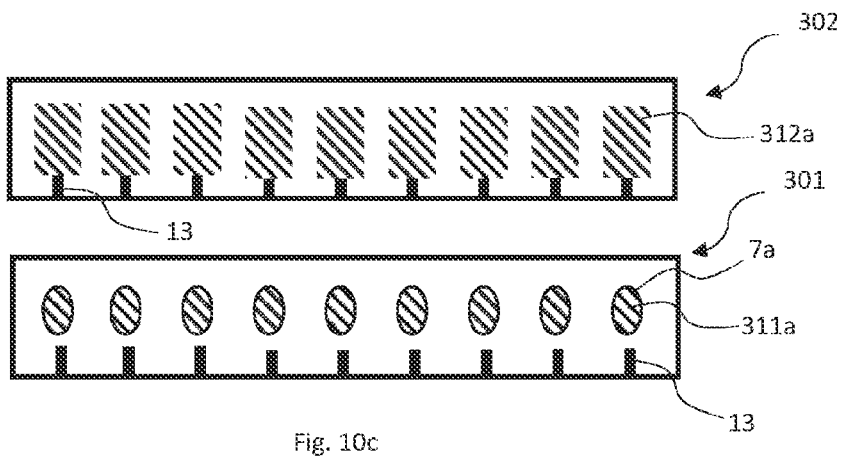
FIG. 10c shows the provision of one or more donor films.

FIG. 10c shows a possible step b) for producing a film intermediate product 1, providing one or more donor films 301, 302, which are provided for example for depositing the film elements 311, 312, 313, 314 represented in FIG. 10b. The donor films 301, 302 are provided in webs by way of example here. It is possible in particular for further donor films 303, 304 to be provided and/or for further film elements to be deposited.

It is possible here for a step c1), bringing one or more donor films 301, 302 into contact with the receiver film 2, to be carried out in step c).

After step c1), it is further possible for a step c2) to be carried out, of detaching, in particular mechanically separating, the donor carrier ply 32 from one or more first partial regions 20a of the respective donor transfer ply at least in regions, in such a way that the one or more first partial regions 20a remain as film elements 311, 312, 313, 314 on the receiver film 2.

After step c2), it is further possible for a step c3) to be carried out, which comprises peeling the respective donor carrier ply 31 with one or more second partial regions 20b of the respective donor transfer ply 32 off the one or more film elements 311 to 314.

The donor film 302 described above has cutout regions 311a, from which in particular the film elements 312, 313, 314 described in FIG. 10b are deposited on the receiver film 2. The depositing on the receiver film 2 is carried out in the case of a donor film 302 of the type described above, preferably by means of a form punch, in particular during a hot stamping. The pressure needed for a hot stamping and the heat needed in step c) are preferably generated by means of hot stamping by a heated stamping die.

The donor film 301 described below has cutout regions 311a, from which in particular the film elements 311 described in FIG. 10b are deposited on the receiver film 2. Here, the donor film 301 preferably at least partially has severances 7a, which surround the cutout regions 311a. The severances 7a are preferably introduced by means of punching.

The depositing of the film elements 311 to 314 on the receiver film 2 is carried out, in the case of a donor film 302 of the type described below, preferably by means of a stamping die, in which the shape of the die can be larger than that of a form punch which would be used in the case of a depositing of a film element with the donor film 302 described above, in order to deposit comparable film elements on the receiver film 2. The pressure needed for a hot stamping and the heat needed in step c) are preferably generated by means of hot stamping by a heated stamping die.

Further, it is possible for a radiation-curable adhesive layer to be printed onto the receiver film 2 and/or one of the donor films 301, 302, in particular to be partially coated on, preferably to be coated individually onto one or more first partial regions.

Here, step c) is preferably carried out by means of cold stamping, wherein the one or more donor films 301, 302 are joined to the receiver film 2 and the adhesive is cured by means of irradiation. During the detachment of the respective donor carrier ply 31, the cutouts of the respective donor transfer plies 32 arranged in the one or more first partial regions 20a on which the adhesive layer is arranged remain adhering as film elements 311 to 314 to the receiver film 2.

Optional adhesion-promoter layers on the receiver film 2 and/or at least one of the one or more donor films 301, 302 preferably ensure the bond between the individual layers of the receiver film 2, the receiver transfer ply 22, at least one of the one or more donor films 301, 302 and/or the respective donor transfer plies 32.

A web preferably has similar and/or different cutout regions 311a to 314a and/or cutouts of the one or more donor films 301, 302 in the running direction 19 and/or transverse to the running direction 19.

In particular, a donor film 301, 302 covers only a surface area of from 0.2% to 20%, preferably a surface area of from 0.5% to 5%, of the receiver film 2 in top view or when viewed perpendicular to the respective donor film 301, 302 and the respective receiver film 2 when the respective film elements 311, 312, 313, 314 are deposited.

The advantage is hereby achieved that, to produce the film intermediate product 1, there is less wastage of materials of the donor films 301, 302, in particular in relation to the surface area of the respective film elements 311, 312, 313, 314.

The donor films preferably have register marks 13, which make a register-accurate depositing of the one or more film elements 311, 312, 313, 314 on the receiver film 2 possible. For example, a register-accurate depositing is thereby possible, in particular in a roll-to-roll method, with different feed distances of the donor films 301, 302, which preferably have smaller distances between the regions 311a, 312a to be deposited or the register marks 13 than between the respectively deposited film elements 311, 312 or the register marks 13 of the receiver film 2, and the receiver film 2.

The two webs or the two donor films 301, 302 are preferably delivered separately. In particular, the two donor films 301, 302 are manufactured separately.

With respect to the specific design of the plies or layers, as well as further plies or layers, reference is made in particular to the above embodiments.

Figure 10D:
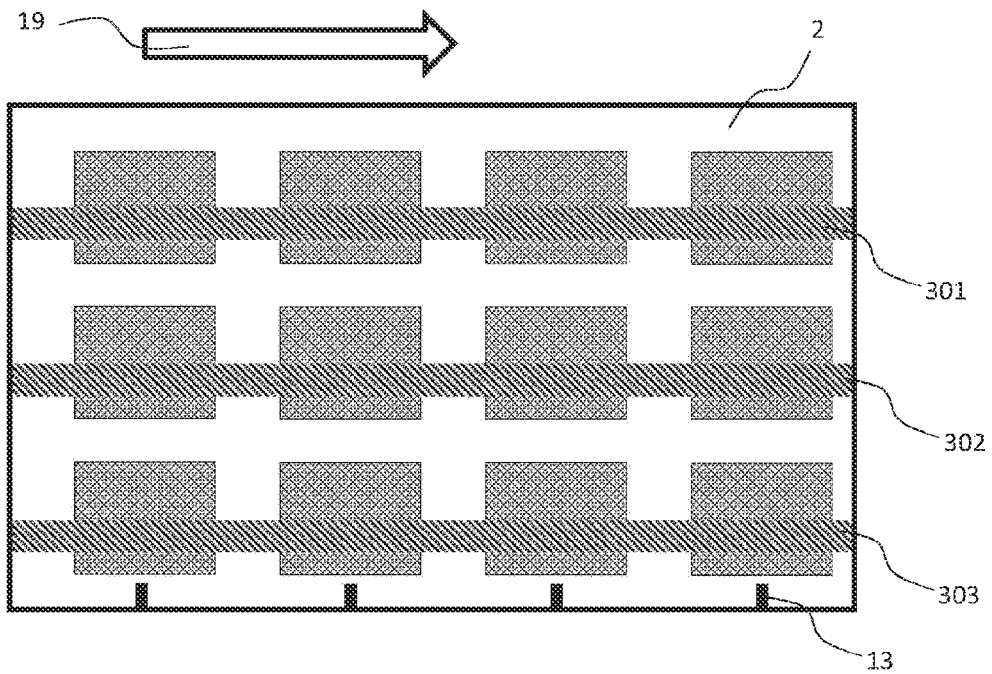
FIG. 10d shows the provision of a receiver film and donor films.

FIG. 10d shows a receiver film 2 with donor films 301, 302, 303 provided strip-shaped.

The depositing of the one or more film elements 311, 312, 313 is preferably carried out register-accurate in the running direction 19 and/or transverse to the running direction 19. Here, the web tensions of the respective donor films 301 to 303 and/or of the receiver film 2 are preferably set for a register-accurate depositing of the film elements 311, 312, 313 on the receiver film 2.

Further, it is possible for the feed distance of the receiver film 2 and/or of the respective donor film 301, 302, 303 to be set for a register-accurate depositing of the film elements 311, 312, 313 on the receiver film 2.

Further, it is possible for the width of the strip of one of the one or more donor films 301, 302, 303, when viewed perpendicular to the plane spanned by a donor film or by a film element, preferably in a top view as represented in FIG. 10d, to vary perpendicular to the running direction 19 over the length of the strip in the running direction 19, preferably for the outline shape of one of the one or more donor films 301, 302, 303 to run at least partially non-linearly, preferably in the shape of waves.

The design, in particular the design of at least one film element 311, 312, 313, is effected for example by a partial print during the cold stamping, an only partially deposited hot-stamping adhesive, and/or because of the shape of the stamping tool during the hot stamping. Further, it is possible for the design to be effected by a cutting of the donor film 301, 302, 303. For example, a film element 311, 312, 313, in particular a strip-shaped film element 311, 312, 313, is defined in terms of the extent by the prior cutting of the respective donor film 301, 302, 303 in strip form.

In particular, the outline shape of one of the one or more film elements 311, 312, 313, which is or are preferably formed of a cutout of a donor film 301, 302, 303 provided strip-shaped, runs in the form of lines, motifs and/or text.

Further, it is possible for one or more of the one or more donor films 301 to 303 and/or one or more of the one or more film elements 311, 312, 313, when viewed perpendicular to the plane spanned by a donor film or by a film element, respectively, preferably in a top view as represented in FIG. 10d, to have recesses and/or to be broken, preferably by means of recesses 6, severances 7a and/or voids, as is described in particular in FIG. 3c to FIG. 3f.

In particular, the width of the strip of one of the one or more film elements 311, 312, 313, preferably perpendicular to the running direction 19, lies in a width range of from 0.5 mm to 10 mm, preferably from 1 mm to 5 mm. Here, the width of the strip of one of the one or more film elements 311, 312, 313 lies for example in the named width range locally and preferably deviates from it locally.

With respect to the specific design of the plies or layers, as well as further plies or layers, reference is made in particular to the above embodiments.

Figure 10E:
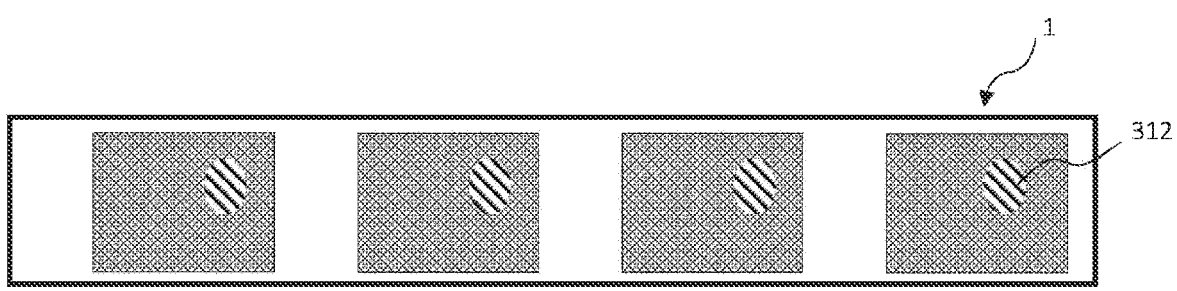
FIG. 10e shows a film intermediate product.

FIG. 10e shows by way of example a singulation after step c), in particular by cutting and/or punching, of the receiver film 2 with the one or more film elements 311 to 314. A strip-shaped web is preferably and/or several strip-shaped webs, which preferably in each case form one film intermediate product 1, are preferably cut out of the receiver film 2 with the film elements 311 to 314.

After step c) and before the singulation, a single- or multi-layered further adhesive layer 8 is preferably deposited, as described above, on the receiver film 2 and/or the one or more film elements 311 to 314.

It is also possible for at least one layer of the further adhesive layer 8 to be formed from the donor detachment layer 33.

In particular, the further adhesive layer 8 is deposited in such a way that differences in thickness of the film intermediate product 1 are at least partially compensated for. Further, it is possible for the width of the strip of the film intermediate product 1, when viewed perpendicular to the plane spanned by film intermediate product 1, preferably in a top view as represented in FIG. 10e, to vary over the length of the strip, preferably for the outline shape of the film intermediate product to run at least partially non-linearly, preferably in the shape of waves.

It is possible, in order to produce a product, for the film intermediate product 1 to be applied to a target substrate, preferably to be applied to a target substrate in a laminator, a hot-stamping device, a cold-stamping device and/or in an application system.

Further, it is possible for the film intermediate product 1 to be applied to the target substrate by injection of an injection-molding compound, in particular wherein the injection-molding compound forms the target substrate.

Here, it is possible in particular for the film intermediate product 1 to be deformed beforehand, in particular to be deep drawn.

The film intermediate product 1 is preferably applied to an injection-molding compound after the singulation as an insert sheet, and has a width in the range of from 10 mm to 800 mm and a length in the range of from 15 mm to 1,200 mm. Here, in particular, the thickness of the film intermediate product 1 is preferably 20 μm to 300 μm, wherein the thickness in particular varies over the width and length of the film intermediate product 1.

In particular, depending on the target substrate to which the film intermediate product 1 is applied, differences in thickness of the film intermediate product 1 are further concealed, with the result that they do not become conspicuously visible.

The film intermediate product 1 is preferably applied to a porous target substrate, such as for example paper, which absorbs the adhesive differently depending on the local pressure, with the result that more adhesive penetrates into the target substrate in regions of the film intermediate product 1 with larger thicknesses. In particular, this prevents possible disruptive steps due to the different thicknesses from being recognizable on the surface of the product.

In the case of embedding in a layered composite, such as for example laminating into a polymer layered composite, or also in the case of back-injection molding by means of an injection-molding compound, in particular differences in thickness are not very relevant for the product, as they are compensated for to a substantial degree by flowable material. In addition, a levelling of the surface can be achieved by the adhesive running during the application to the target substrate.

In particular, the film intermediate product 1 is used to produce a surface of the product and is applied to a target substrate, for example a piece of paper, a piece of cardboard, a plastic film, a substrate made of one or more plastic and/or paper plies, a substrate comprising one or more decorative plies and/or a carrier ply.

The total thickness of the single- or multi-layered further adhesive layer 8 is preferably more than the maximum difference in thickness between the regions with the one or more film elements 311 to 314 and those regions without film elements 311 to 314, in order that the contours of the film elements 311 to 314 are not conspicuously recognizable on the surface.

The total thickness of the single- or multi-layered further adhesive layer 8 is preferably more than the difference between the largest thickness of the film intermediate product 1 and the smallest thickness of the film intermediate product 1, in order that the contours of the film elements 311 to 314 are not conspicuously recognizable on the surface.

The thickness of the further adhesive layer 8 is preferably coated on, in particular partially, in such a way that it is thicker in the regions of the receiver film 2 without film elements 311 to 314 and/or in regions with the smallest thickness of the film intermediate product than in the regions of the receiver film 2 with film elements 311 to 314 and/or in regions with the largest thickness of the film intermediate product 1.

An additional auxiliary layer, which expediently forms a layer of the single- or multi-layered adhesive layer 8 which compensates for differences in thickness of the film intermediate product 1, is preferably coated on partially registered. The single- or multi-layered further adhesive layer 8 is then preferably coated on with a homogeneous layer thickness. For example, after the additional auxiliary layer has been coated on, at least one layer of the further adhesive layer 8 is coated on with a homogeneous layer thickness.

With respect to the softening temperature of the receiver adhesive layer 24, the donor adhesive layer 34 and the further adhesive layer 8, reference is made at this point in particular to the embodiments in FIG. 6.

In the case of a transfer by means of radiation-curing adhesive, in particular by forming the donor adhesive layer 34 as a radiation-curable adhesive and/or forming the receiver adhesive layer 24 as a radiation-curable adhesive and/or forming the further adhesive layer 8 as a radiation-curable adhesive, advantages result because the adhesive is thermally relatively stable after curing and/or only comparatively little heat and pressure is introduced during the transfer to the target substrate.

With respect to the specific design of the plies or layers, as well as further plies or layers, reference is made in particular to the above embodiments.

Figure 11A:
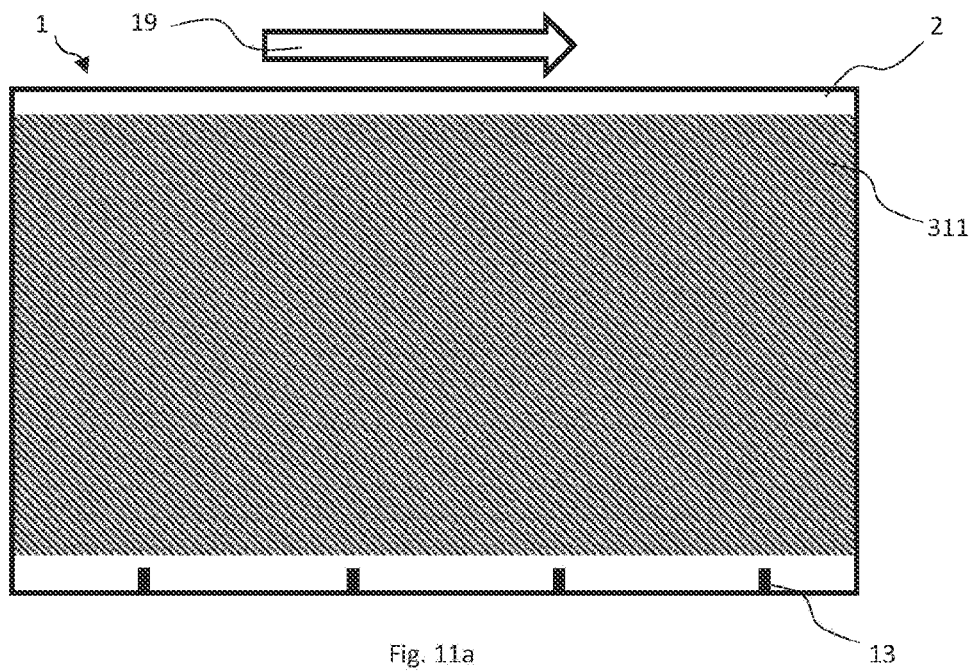
FIG. 11a shows a film intermediate product.

FIG. 11*a* shows by way of example a receiver film 2 with a film element 311 transferred flat. Here, the donor film 301 is a donor transfer film. Further, the receiver film 2 has a delamination ply 18. A delamination ply which allows a locally partial delamination in order to act as protection against manipulation is particularly advantageous. It is also possible for the donor film 301 to have a delamination ply 18.

The thickness of the donor transfer ply 32, preferably the thickness of the donor carrier ply 32 added to the thickness of the further optionally present adhesive layers 24 and 34, advantageously lies in a range of from 1 µm to 15 µm, preferably in a range of from 2 µm to 10 µm. The thickness of the receiver carrier ply preferably lies in a range of from 5 µm to 150 µm, preferably in a range of from 10 µm to 50 µm.

Here, the advantage results that features on transfer films are manufactured independently of the properties and/or the process capability, preferably the requirements of production, of the delamination ply.

A combination of optical effects, which are in particular provided with the one or more donor films 301 to 304, is thereby preferably produced with the function of a delamination ply, which is provided in particular through the delamination ply 18 of the receiver film 2. In particular, such a combination is not possible in the case of production on one film and/or can only be produced at higher cost, with more waste, with poorer protection against forgery and/or in lower quality.

In particular, a film element 311 to 314 has optical effects which have a very high replication quality, whereby high temperatures and a high pressure are needed. Due to the high pressure and the high temperatures, however, the delamination ply would be damaged if manufactured on the same film.

Figure 11B:
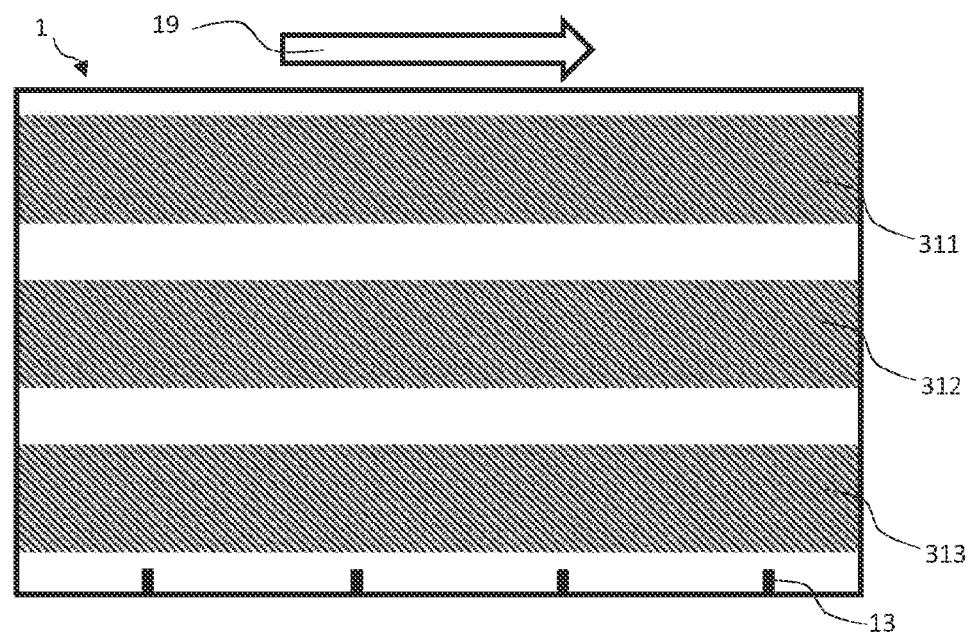
FIG. 11b shows a film intermediate product.

FIG. 11*b* shows by way of example a receiver film 2 with film elements 311, 312, 313 transferred strip-shaped. Here, the donor film 301 is a donor transfer film. Further, the receiver film 2 has a delamination ply 18. It is also possible for the donor film 301 to have a delamination ply 18.

Figure 11C:
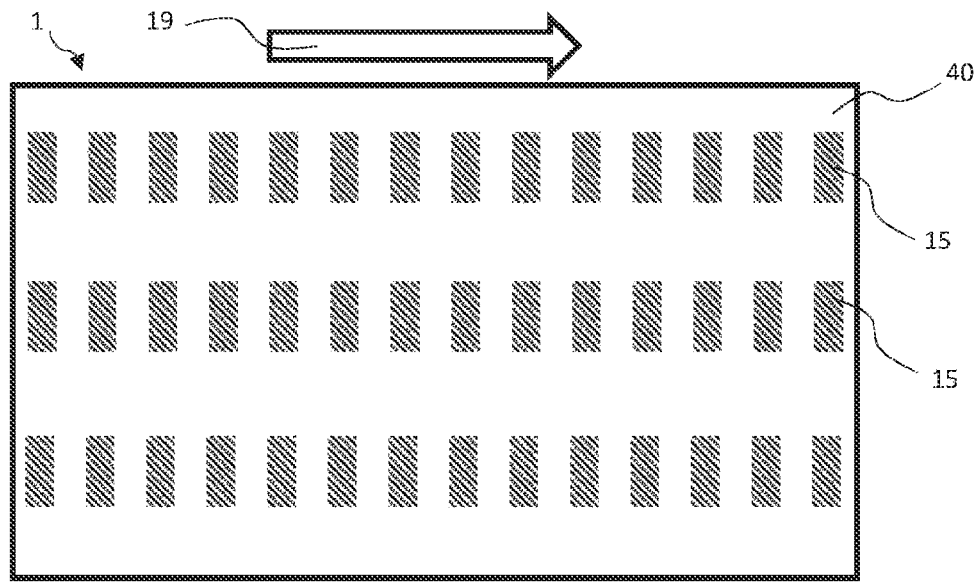
FIG. 11c shows a film intermediate product.

FIG. 11*c* shows a film intermediate product 1 which has several labels 15 in a top view. The labels 15 in each case comprise at least one cutout of the receiver film 2 and at least one film element 311 to 314.

Figure 11D:
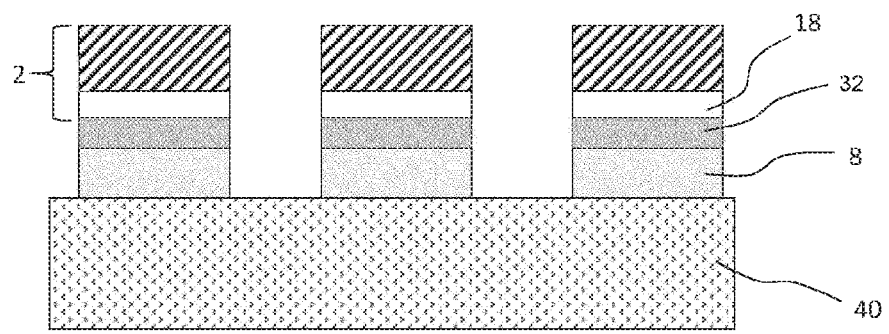
FIG. 11d shows a film intermediate product.

FIG. 11*d* shows the film intermediate product 1 represented in FIG. 11*c* in a schematic sectional representation.

In order to produce such a film intermediate product 1, the receiver film 2 is preferably coated onto a carrier 40, in particular a siliconized carrier. In particular, it is possible for a further adhesive layer 8, in particular a PSA adhesive layer (PSA=Pressure Sensitive Adhesive), to be applied to the film elements 311 after step c), for the receiver film 2 with the deposited film elements 311 to 314 to be laminated by means of the further adhesive layer 8 onto the carrier 40, and for the receiver film 2 optionally to be punched and weeded. In particular, the receiver film 2 is punched and weeded before being joined to the carrier 40 and/or punched and weeded after being joined to the carrier 40.

The labels 15 can preferably be detached from the carrier 40 nondestructively by means of the PSA adhesive layer.

Further, it is possible for the further adhesive layer 8, which is in particular a PSA adhesive layer, to be applied to the carrier 40, the receiver film 2 and/or partial regions of the receiver film 2.

One or more labels 15 are preferably detached from the carrier 40 and applied to a further object, wherein the delamination ply 18 is provided to bring about a delamination of the label 15, and/or brings about a tearing of layers of the label 15, in the case of an attempt to detach the label 15 from the further object.

Figure 12A:
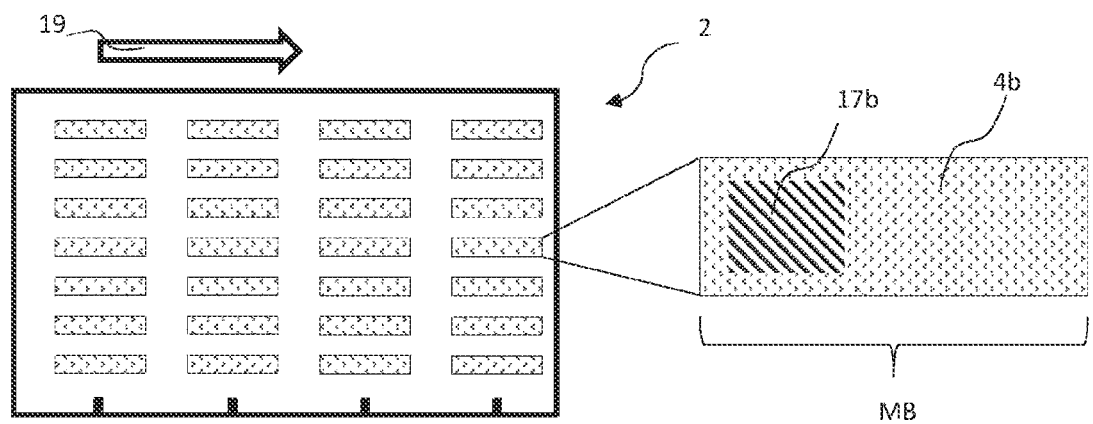
FIG. 12a shows a receiver film.

FIG. 12*a* shows by way of example the provision of a receiver film 2, which is in particular a receiver laminating film with a receiver carrier ply 21, and an enlarged view of a feature region MB of a decorative ply 4*b*, which is preferably arranged on the receiver carrier ply 21 of the receiver film 2.

The decorative ply 4*b* preferably has at least one feature region MB, in particular a plurality of feature regions MB. The decorative ply 4*b* preferably forms one or more security features by means of the feature regions MB.

A feature region MB preferably has at least one first decorative element 17*b*. In particular, several feature regions MB and/or several first decorative elements 17*b* are provided in a regular one- or two-dimensional grid.

The decorative ply 4*b* preferably further has, in the feature regions MB, an at least partially transparent layer, at least one at least partially embellished transparent reflective layer and/or at least one at least partially embellished metallic reflective layer and/or an at least partially embellished print.

Further, it is possible for the receiver film 2 to have an assistance layer 11*b*, in particular an adhesion-promoter layer.

It is also possible for register marks to be provided on the receiver film 2.

A film intermediate product 1, which is used to produce a security document, in particular a banknote, is thus preferably produced.

Figure 12B:
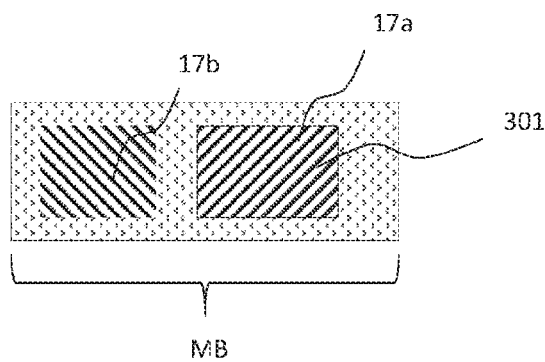
FIG. 12b shows a feature region with decorative elements.

FIG. 12*b* shows by way of example a feature region MB of the receiver film 2 represented enlarged in FIG. 12*a*, wherein a second decorative element 17*a* is deposited, which is formed by a film element 311, wherein the film element 311 is formed of a cutout of one of the one or more donor films 301 to 304, which is in particular a donor transfer film. In particular, the second decorative element 17*a* differs from the first decorative element 17*b*.

Preferably, the film element 311 has a printed layer, in particular a varnish layer, and/or an optically diffractive element, which consists of a replication layer with a molded diffractive surface structure, which is covered by a reflective layer at least in partial regions.

It is further possible for the first and second decorative elements 17*a*, 17*b* to at least partially overlap mutually and/or among one another and/or for further decorative elements to be applied which mutually overlap and/or overlap the first and/or second decorative elements 17*a*, 17*b*.

The film intermediate product 1, preferably when viewed perpendicular to a plane spanned by the film intermediate product, preferably top view as shown in FIG. 12b, preferably has at least two different directly adjoining, at least partially overlapping and/or neighboring decorative elements. These are preferably formed in each case by at least one film element 311, 312 and/or by the receiver film 2.

The receiver film 2 and the one or more donor films 301, 302 are preferably delivered separately. In particular, in each case the donor films 301, 302 and the receiver film 2 are manufactured separately. In particular, the advantage thus results that, when viewed perpendicular to a plane spanned by the film intermediate product 1, preferably top view as shown in FIG. 12b, at least two different decorative elements, which would be incompatible in the case of a manufacture on one film and/or would at least mean an increase in the manufacturing time, a reduction in the quality of the features and/or more waste, are arranged directly adjoining one another, at least partially overlapping and/or neighboring.

The decorative elements 17a, 17b preferably consist in each case of regions of the decorative ply 4a, 4b of the receiver film 2 and/or of the one or more donor films 301 to 304, which differ from the surrounding regions in a contrasting manner. Thus, for example, a varnish layer of the decorative ply in the region of the decorative elements is colored differently from the surrounding regions and/or is only provided in the region of the decorative elements.

Likewise, for example, a surface structure, for example a diffractive surface relief, of the decorative ply 4a, 4b can be provided only in the region of the decorative elements 17a, 17b or have a different surface relief from the surrounding regions. For example, a metallic reflective layer of the decorative ply 4a, 4b can also be provided only in the region of the decorative elements 17a, 17b, but not in the surrounding regions. The decorative ply 4a, 4b is preferably formed transparent in the region outside the decorative elements 17a, 17b.

Likewise, a functional ply 5a, 5b of the one or more donor films 301 to 304 and/or of the receiver film 2 can be formed correspondingly, that the function, for example an electrical function, is only formed in the region of the decorative elements 17a, 17b.

Thus, it is possible for example for an electrical component, for example a display and/or an antenna, to be formed only in the region of the decorative elements 17a, 17b in the functional ply 5a, 5b.

Further, it is possible for the decorative elements to be provided by the applied cutouts of the one or more donor films 301 to 304 and for their shape thus to be defined by the cutout and not by a corresponding design of the decorative ply 4a of the donor film 301 to 304.

A film intermediate product 1, which is used to produce a security document, in particular a banknote, an ID document, a credit card and/or a bank card, is thus preferably produced.

Further, it is possible for a film intermediate product 1 to be produced which has in particular a security feature in the form of a thread, the width of which preferably lies in a range of from 0.5 mm to 15 mm, preferably in a range of from 1.5 mm to 7.5 mm.

It is possible here for an additional film to be applied to the receiver film 2 with the film elements 311 to 314 after the film elements 311 to 314 have been deposited on the receiver film 2. The additional film consists in particular of PET and preferably has a thickness in the range of from 5 μm to 50 μm, preferably in the range of from 5 μm to 20 μm. This results in particular in the advantage that the film elements 311 to 314 are enclosed and protected.

Further, it is possible for a single- or double-sided adhesive coating to be deposited, in order to ensure the anchoring in the target substrate, for example as a thread in the paper, or embedded in plastic. The film intermediate product 1 is then cut into strips.

In particular, the second decorative elements 17a cover only a surface area in the range of from 10% to 90%, preferably a surface area in the range of from 20% to 80%, of the receiver film 2 in a top view or when viewed perpendicular to the receiver film 2 after the respective film elements have been deposited.

The decorative elements 17a of the one or more donor films 301 to 304 can be transferred to a laminating film as receiver film 2 in such a way that the laminating film is not covered by the decorative elements 17a of the donor films 301 to 304 in partial regions. An adhesive layer is then coated on flat.

During a subsequent application to a target substrate, the adhesive layer joins the laminating film and the target substrate in these partial regions directly, without interjacent donor transfer plies 32, with the result that a good adhesion is achieved. It is particularly advantageous if the features of the donor film, in particular the film elements 311 to 314, preferably the decorative elements 17a, are transferred as a filigree pattern. The surface coverage advantageously lies between 10% and 90%, further between 20% and 80%.

Figure 13A:
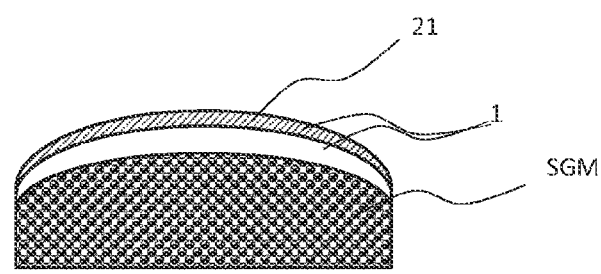
FIG. 13a shows a film intermediate product applied to a target substrate.

FIG. 13a shows by way of example a film intermediate product 1 applied to an injection-molding compound SGM, wherein the film intermediate product 1 is in particular back-injection molded with the injection-molding compound SGM.

Here, the film intermediate product 1 has a receiver film 2 as receiver transfer film, wherein at least one film element 311 to 314 is deposited on the receiver transfer film 22. In particular, the receiver film 2 has a receiver carrier ply 21, which preferably protects the receiver transfer ply 2 against damage. The receiver carrier ply 21 is preferably securely joined to the receiver transfer ply 2 and/or designed detachable.

The film intermediate product 1 preferably has at least one functional ply 5a, 5b, for example a display, and/or at least one decorative ply 4a, 4b, for example a varnish layer.

Figure 13B:
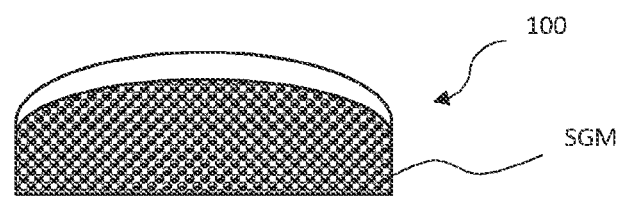

FIG. 13b shows the product 100 depicted in FIG. 13a, wherein the receiver carrier ply 21 has been detached.

It is in particular also possible for the film intermediate product 1 to have been laminated, cold stamped and/or hot stamped onto a product and/or target substrate beforehand.

It is in particular possible for the receiver transfer ply 22 to have a surface structure, in particular a surface relief, after the receiver carrier ply 21 has been detached. For this purpose, a printed varnish is preferably arranged between the receiver carrier ply 21 and the receiver transfer ply 22, in particular on the receiver carrier ply 21. When the carrier ply is peeled off, the varnish printed on the receiver carrier ply 21 is likewise peeled off with it, and a negative structure of the varnish printed on the receiver carrier ply 21 is present on the surface of the receiver transfer ply 22.

Further, it is possible for a replication layer, which is preferably radiation-curable, to be arranged between the receiver carrier ply 21 and the receiver transfer ply 22, in particular on the receiver carrier ply 21. A surface structure, which generates a decorative effect after the receiver carrier ply 21 and the replication layer have been detached, is preferably introduced into this replication layer.

LIST OF REFERENCE NUMBERS 1 film intermediate product
2 receiver film
21 receiver carrier ply
22 receiver transfer ply
23 receiver detachment layer
24 receiver adhesive layer
301, 302, 303, 304 donor film
311, 312, 313, 314 film element
31 donor carrier ply
31a further donor carrier plies
32 donor transfer ply
33 donor detachment layer
34 donor adhesive layer
4a, 4b decorative ply
5a, 5b functional ply
6 recesses
7a, 7b severances
8 further adhesive layer
9a, 9b replication layer
10a, 10b reflective layer
11a, 11b assistance layer
12a, 12b carrier ply
13 register marks
14 peeling angle
15 label
16 further carrier ply
17a second decorative elements
17b first decorative elements
18 delamination ply
19 running direction
20a first partial regions
20b second partial regions
311a cutout regions
40 carrier
311b, 312b layers provided over part of the surface
KB contact region
MB feature region
SGM injection-molding compound
100 product

The invention claimed is:

1. A method for producing a film intermediate product, comprising the following steps:
 a) providing a receiver film;
 b) providing one or more donor films;
 c) depositing one or more film elements, which is or are formed in each case of a cutout of one of the one or more donor films, on the receiver film,
 wherein the receiver film has a receiver adhesive layer on the side facing the one or more donor films in step c) and the one or more donor films in each case have a donor adhesive layer on the side facing the receiver film in step c), and
 wherein the softening temperature of the donor adhesive layer and that of the receiver adhesive layer differ, and
 wherein the donor adhesive layer is crosslinked chemically and/or by radiation whereby the softening temperature of the donor adhesive layer is increased after step c).

2. The method according to claim 1, wherein, the receiver film is a receiver transfer film and/or wherein at least one of the one or more donor films is a donor transfer film.

3. The method according to claim 1, wherein the following steps are carried out in step c):
 c1) bringing one or more donor transfer films into contact with the receiver film,
 c2) detaching a donor carrier ply from one or more first partial regions of a respective donor transfer ply of the donor film at least in regions in such a way that the one or more first partial regions remain as one or more of the one or more film elements on the receiver film.

4. The method according to claim 3, wherein one or more of the first partial regions in step c) are defined individually by means of a thermal-transfer printhead and/or by means of irradiation.

5. The method according to claim 1, wherein one or more thermal elements are actuated in step c).

6. The method according to claim 1, wherein, in step c), an adhesive layer is printed onto one or more of the donor films and/or onto the receiver film in one or more of the first partial regions but is not printed on in one or more second partial regions.

7. The method according to claim 1, wherein in step c), an adhesive layer is activated in the one or more first partial regions but is not activated in one or more second partial regions.

8. The method according to claim 1, wherein one or more severances, voids and/or recesses are introduced at least into one of the one or more donor films.

9. The method according to claim 1, wherein the receiver film is a hot-stamping film and wherein at least one of the one or more donor films is a hot-stamping film.

10. The method according to claim 1, wherein step c) is carried out by means of hot stamping and/or cold stamping and/or thermal transfer.

11. A method for producing a film intermediate product, comprising the following steps:
 a) providing a receiver film;
 b) providing one or more donor films; and
 c) depositing one or more film elements, which is or are formed in each case of a cutout of one of the one or more donor films, on the receiver film,
 wherein the following steps are carried out in step c):
 c1) bringing one or more donor transfer films into contact with the receiver film; and
 c2) detaching a donor carrier ply from one or more first partial regions of a respective donor transfer ply of the donor film at least in regions in such a way that the one or more first partial regions remain as one or more of the one or more film elements on the receiver film, and
 wherein the detachment force between the donor carrier ply and the donor transfer ply is smaller than the detachment force between a receiver carrier ply and a receiver transfer ply of the receiver film.

12. The method according to claim 11, wherein the force for detaching the donor carrier ply from the donor transfer ply lies in the range of from 0.3 cN per cm of strip width to 50 cN per cm of strip width, and/or wherein the force for detaching the receiver carrier ply from the receiver transfer ply lies in the range of from 0.3 cN per cm of strip width to 75 cN per cm of strip width.

13. The method according to claim 1, wherein the receiver film is a multi-layer film and/or wherein at least one of the one or more donor films is a multi-layer film.

14. The method according to claim 13, wherein at least one of the one or more donor films and/or one or more cutouts of the at least one or more donor films, which form one or more of the one or more film elements, is or are deposited on the receiver film in step c) by means of lamination.

15. The method according to claim 11, wherein the receiver film has a receiver adhesive layer on the side facing the one or more donor films in step c) and/or the one or more donor films in each case have a donor adhesive layer on the side facing the receiver film in step c).

16. The method according to claim 1, wherein a further adhesive layer is deposited on a target substrate, on the receiver film and/or on the one or more donor films and/or the respective donor transfer ply, wherein the further adhesive layer is single-or multi-layered.

17. The method according to claim 16, wherein the further adhesive layer is deposited as an adhesive layer of an assistance layer and/or of a donor detachment layer of the one or more donor films.

18. The method according to claim 16, wherein the softening temperature of the donor adhesive layer and/or the softening temperature of the receiver adhesive layer differs from the softening temperature of the further adhesive layer.

19. The method according to claim 1, wherein the softening temperature of the donor adhesive layer is at least 2.5° C. below the softening temperature of the receiver adhesive layer.

20. The method according to claim 16, wherein the softening temperature of the further adhesive layer is at least 2.5° C., below the softening temperature of the donor adhesive layer and/or of the receiver adhesive layer
and/or wherein a softening of the further adhesive layer is carried out, wherein the temperature of the donor adhesive layer and/or of the receiver adhesive layer is at least 2.5° C. lower, than the softening temperature of the respective donor adhesive layer or receiver adhesive layer.

21. The method according to claim 1, wherein the softening temperature of the receiver adhesive layer is increased after step c).

22. The method according to claim 1, wherein, in step c), one or more of the film elements are deposited in such a way that they overlap the receiver film only in regions.

23. The method according to claim 1, wherein, in step c), the one or more film elements are deposited in such a way that they overlap in each case less than 5% of the surface of the receiver film.

24. The method according to claim 1, wherein the receiver film and/or at least one of the one or more donor films is provided with one or more severances, voids and/or recesses, wherein the shape of the one or more severances, voids and/or recesses is selected from the group consisting of: strip-shaped, round-shaped, circular-shaped, oval-shaped, polygonal-shaped, rectangular-shaped, square-shaped, and a shape in the form of one or more of alphanumeric characters, logos, microtexts, images, portraits and/or pictograms.

25. The method according to claim 24, wherein the one or more severances, voids and/or recesses are formed by means of cutting, punching.

26. The method according to claim 1, wherein after step c), a singulation of the receiver film with the one or more film elements is carried out.

27. A method for producing a film intermediate product, comprising the following steps:
 a) providing a receiver film;
 b) providing one or more donor films; and
 c) depositing one or more film elements, which is or are formed in each case of a cutout of one of the one or more donor films, on the receiver film,
wherein the following steps are carried out in step c):
 c1) bringing one or more donor transfer films into contact with the receiver film; and
 c2) detaching a donor carrier ply from one or more first partial regions of a respective donor transfer ply of the donor film at least in regions in such a way that the one or more first partial regions remain as one or more of the one or more film elements on the receiver film, and
wherein the receiver film is a multi-layer film, and
wherein the detachment force between the donor carrier ply and the donor transfer ply is smaller than the detachment force between any two layers of the receiver film.

* * * * *